(12) United States Patent
Kawana et al.

(10) Patent No.: US 7,830,472 B2
(45) Date of Patent: Nov. 9, 2010

(54) BLUE COLOR COMPOSITION FOR COLOR FILTER, COLOR FILTER, AND COLOR IMAGE DISPLAY DEVICE

(75) Inventors: Shin Kawana, Yokohama (JP); Hideaki Kaneda, Ushiku (JP); Naoto Kijima, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 441 days.

(21) Appl. No.: 11/587,638

(22) PCT Filed: Apr. 25, 2005

(86) PCT No.: PCT/JP2005/007839

§ 371 (c)(1),
(2), (4) Date: Nov. 20, 2007

(87) PCT Pub. No.: WO2005/111707

PCT Pub. Date: Nov. 24, 2005

(65) Prior Publication Data

US 2008/0212305 A1 Sep. 4, 2008

(30) Foreign Application Priority Data

Apr. 26, 2004 (JP) .............................. 2004-129417
Jul. 6, 2004 (JP) .............................. 2004-199851

(51) Int. Cl.
*G02F 1/1335* (2006.01)
(52) U.S. Cl. ............................ 349/61; 349/65; 349/106; 349/71; 362/612
(58) Field of Classification Search ................. 349/106, 349/61, 65, 69, 71; 362/602, 611, 612, 615
See application file for complete search history.

(56) References Cited

U.S. PATENT DOCUMENTS

| 4,940,918 | A | 7/1990 | Rutfield |
| 6,100,312 | A | 8/2000 | Suzuki et al. |
| 6,280,890 | B1 | 8/2001 | Sawamura et al. |
| 7,006,172 | B2 | 2/2006 | Kawana et al. |
| 2003/0164904 | A1 | 9/2003 | Grohn et al. |
| 2004/0218115 | A1* | 11/2004 | Kawana et al. ............... 349/71 |
| 2004/0251809 | A1 | 12/2004 | Shimomura et al. |

FOREIGN PATENT DOCUMENTS

| EP | 0 359 934 A1 | 3/1990 |
| EP | 0 371 398 A2 | 6/1990 |
| EP | 1 403 355 A1 | 3/2004 |

(Continued)

OTHER PUBLICATIONS

"Liquid Crystal Display Device Realizing Wide Color Reproducibility by High Power Led Backlight System." pp. 42-46. Apr. 2003 with English Translation.

(Continued)

*Primary Examiner*—Thoi V Duong
(74) *Attorney, Agent, or Firm*—Oblon, Spivak, McClelland, Maier & Neustadt, L.L.P.

(57) ABSTRACT

The invention relates to a blue composition for a color filter to realize an image having a high color purity corresponding to the emission wavelength of an improved LED backlight, a color filter and a color image display device.

5 Claims, 5 Drawing Sheets

| | FOREIGN PATENT DOCUMENTS | |
|---|---|---|
| JP | 60-237403 | 11/1985 |
| JP | 9-97017 | 4/1997 |
| JP | 11-242214 | 9/1999 |
| JP | 2000-81683 | 3/2000 |
| JP | 2001-228319 | 8/2001 |
| JP | 2002-229023 | 8/2002 |
| JP | A-2003-64358 | 3/2003 |
| JP | 2003-253148 | 9/2003 |
| JP | 2003-287746 | 10/2003 |
| JP | 2004-10838 | 1/2004 |
| JP | 2004-85592 | 3/2004 |
| JP | 2004-94039 | 3/2004 |
| JP | A-2005-243699 | 9/2005 |

OTHER PUBLICATIONS

Korean Notice of Grounds for Rejection, Issuance date May 27, 2010, 4 pp. (w/attached English Translation).

* cited by examiner

Backlight 3

Backlight 4

BLUE COLOR COMPOSITION FOR COLOR FILTER, COLOR FILTER, AND COLOR IMAGE DISPLAY DEVICE

CROSS REFERENCE TO RELATED APPLICATION

This application is a 371 of PCT/JP05/007839, filed on Apr. 25, 2005, and claims priority to the following Japanese Patent Applications: JP 2004-129417, filed on Apr. 26, 2004; and JP 2004-199851, filed on Jul. 6, 2004.

TECHNICAL FIELD

The present invention relates to a blue composition for a color filter, a color filter and a color image display device. Particularly, it relates to a blue composition for a color filter to realize an image having a high color purity corresponding to the emission wavelength of an improved LED backlight, a color filter and a color image display device.

BACKGROUND ART

In recent years, liquid crystal display elements are expected not only in the conventional application to personal computer monitors but also in application to ordinary color televisions. The color gamut of color liquid crystal display elements is determined by chromaticity of light emitted from red, green and blue pixels and, where chromaticity points of the respective color pixels in CIE system of color representation are represented by $(x_R, y_R)$, $(x_G, y_G)$, $(x_B, x_B)$, the color gamut is defined by an area of a triangle surrounded by these three points on a x-y chromaticity diagram. Namely, the larger the area of this triangle, the more vivid color image the display elements reproduce. The area of this triangle is usually expressed using a ratio of the area of the triangle to the area of a reference triangle formed by three points of the three primary colors, red (0.67,0.33), green (0.21,0.71) and blue (0.14,0.08), in the standard system defined by US National Television System Committee (NTSC) (in unit of %, hereinafter referred to simply as "NTSC percentage"). Ordinary notebook computers have the values of approximately 40 to 50%, desktop computer monitors the values of 50 to 60%, and existing liquid crystal TVs the values of approximately 70%.

A color image display device utilizing such color liquid display elements is mainly composed of light shutters utilizing liquid crystal, a color filter having red, green and blue pixels, and a backlight for transmission illumination, and the chromaticity of light emitted from the red, green and blue pixels are determined by the emission wavelengths of the backlight and the transmittance spectrum of the color filter.

In the color liquid crystal display elements, the color filter extracts only wavelengths in necessary regions from the emission distribution of the backlight to provide the red, green and blue pixels.

Methods for production of this color filter proposed heretofore include such methods as dying, pigment dispersion, electro-deposition, printing, inkjet, and so on. The colorant for coloring used to be dyes, but are now pigments in terms of reliability and durability as liquid crystal display elements. Accordingly, the pigment dispersion is most commonly used as a method for production of the color filter at present in terms of productivity and performance. In general, in use of an identical colorant, the NTSC percentage and brightness are in a trade-off relation and are appropriately used according to applications.

On the other hand, the backlight generally used is one using as a light source a cold cathode fluorescent lamp with emission wavelengths in the red, green and blue wavelength regions and using a light guide plate for converting a light emitted from this cold cathode fluorescent lamp into white area light source. In recent years, a LED is becoming used from such a viewpoint that it has a long life, it requires no inverter, it provides a high brightness and it is free from mercury.

A conventional LED backlight uses blue light emitted from a LED and a yellow phosphor obtained by excitation using the blue light as a white area light source.

However, the above-described light source employs a yellow phosphor, and thus there are a great deal of emission of lights, with unnecessary wavelengths in terms of the color purities of red and green, and it has been difficult to obtain a high gamut display. As a countermeasure, it is possible to cut out lights with unnecessary wavelengths by a color filter to increase the color purities of red and green in principle, but most part of emission from the backlight is cut out, and thus the brightness will significantly decrease. Particularly by this method, red emission will significantly decrease, and accordingly it is practically impossible to reproduce a strongly reddish color. Further, the emission wavelength distribution of a LED has such characteristics that the emission intensity is high in a range of from 460 to 480 nm as compared with that of a cold cathode fluorescent lamp. The light in this wavelength region deteriorates the color purity of a blue pixel and thereby is required to be cut out by a blue color filter as far as possible. However, a conventional blue composition for a color filter (hereinafter sometimes referred to simply as a blue composition or a blue resist) and a color filter have not had sufficient performance to cut out lights with wavelengths of from 460 to 480 nm, and are not sufficiently suitable for a color image display device using a LED as a backlight.

In order to overcome this problem, a method of combining a LED which emits red, green and blue lights has been proposed (Non Patent Document 1) in recent years, and a display having an extremely high gamut has been produced experimentally by this method. However, since red, green and blue LED chips are independently assembled, there are such problems that 1) mounting takes effort, 2) red, green and blue LED chips are disposed with limited distances, and thus the distance from the respective LED chips to a light guide plate is required to be long for sufficient color mixture of emission from the respective LED chips, and 3) integral multiple numbers of the respective LED chips are combined to adjust the white chromaticity, and thus the white balance cannot continuously be adjusted.

Non Patent Document 1: Monthly DISPLAY April 2003, p. 42 to 46

DISCLOSURE OF THE INVENTION

Problems that the Invention is to Solve

Under these circumstances, it is an object of the present invention to provide such a color image display device that reproduction of a deep red and green image can be realized without sacrifice of the brightness of the image even with a LED backlight, and a wide color gamut over the entire image can be achieved by using a blue resist and a color filter corresponding to the above deep red and green, and further, red, green and blue emission is achieved by one chip, whereby productivity in mounting will not be impaired, and the white balance can be easily adjusted.

Means of Solving the Problem

The present inventors have conducted extensive studies and as a result, found it possible to realize an image having a high color purity, by improving the emission wavelength of a backlight and by adjusting the transmittance of a color filter correspondingly to the emission wavelength of the backlight as well. The present invention has been made based on the above discovery, and provides the following (A) to (K).

(A) A blue composition for a color filter, which comprises a binder resin (a) and/or a monomer (b) and a colorant (c), wherein a cured product of the blue composition has an average value $T^B(460\text{-}480)$ (%) of the spectral transmittance at a wavelength at every interval of 5 nm in a range of from 460 to 480 nm of at most 65%.

(B) A color filter having a pixel formed by using the blue composition for a color filter as defined in the above (A).

(C) A color image display device formed by using the color filter as defined in the above (B).

(D) A color image display device comprising a combination of light shutters, a color filter having color elements of at least three colors of red, green and blue corresponding to the light shutters, and a backlight for transmission illumination, wherein the backlight contains a LED in its structure, and under the following definitions: $\lambda_n$ nm represents a wavelength at every interval of 5 nm in the visible light range of from 380 to 780 nm; $T^R(\lambda_n)$ a spectral transmittance (%) at a wavelength $\lambda_n$ nm by a red pixel of the color filter; and $I(\lambda_n)$ a relative emission intensity, normalized by a total emission intensity, at a wavelength $\lambda_n$ nm from the backlight, these satisfy the following condition (1):

$$I(620\text{-}680) \times T^R(620\text{-}680) \geq 1.1 \tag{1}$$

wherein $T^R(620\text{-}680)$ and $I(620\text{-}680)$ represent the average transmittance (%) and the average relative emission intensity at 620 nm $\leq \lambda_n \leq$ 680 nm, respectively, and $I(\lambda_n)$ is defined as follows:

$$s(\lambda_n) = \frac{\int_{\lambda_n - \Delta\lambda/2}^{\lambda_n + \Delta\lambda/2} s(\lambda) d\lambda}{\Delta\lambda}$$

$$I(\lambda_n) = \frac{s(\lambda_n)}{\sum_{\lambda=380}^{780} s(\lambda_n)}$$

where $S(\lambda)$ represents a measured value of emission intensity at a wavelength $\lambda$ from the backlight, and $\Delta\lambda = 5$ nm.

(E) A color image display device comprising a combination of light shutters, a color filter having color elements of at least three colors of red, green and blue corresponding to the light shutters, and a backlight for transmission illumination, wherein the backlight has a phosphor layer or a phosphor film, and the phosphor layer or the phosphor film contains a compound represented by the following formula (3):

$$Eu_a Ca_b Sr_c M_d S_e \tag{3}$$

wherein M represents at least one element selected from Ba, Mg and Zn, and a to e are numerical values within the following ranges:

$0.0002 \leq a \leq 0.02$ $0.3 \leq b \leq 0.9998$ d is $0 \leq d \leq 0.1$ $a+b+c+d=1$ $0.9 \leq e \leq 1.1$ (F) A color image display device comprising a combination of light shutters, a color filter having color elements of at least three colors of red, green and blue corresponding to the light shutters, and a backlight for transmission illumination, wherein the backlight has a phosphor layer or a phosphor film, and the phosphor layer or the phosphor film contains a compound containing at least element $M^4$, element A, element D, element E and element X (wherein $M^4$ is one or at least two elements selected from the group consisting of Mn, Ce, Pr, Nd, Sm, Eu, Tb, Dy, Ho, Er, Tm and Yb, and contains at least Eu, A is one or at least two elements selected from the group consisting of bivalent metal elements other than the element $M^4$, D is one or at least two elements selected from the group consisting of tetravalent metal elements, E is one or at least two elements selected from the group consisting of trivalent metal elements, and X is one or at least two elements selected from the group consisting of O, N and F).

(G) A color image display device comprising a combination of light shutters, a color filter having color elements of at least three colors of red, green and blue corresponding to the light shutters, and a backlight for transmission illumination, wherein the backlight contains a LED in its structure, and under the following definitions: $\lambda_n$ nm represents a wavelength at every interval of 5 nm in the visible light range of from 380 to 780 nm; $T^G(\lambda_n)$ a spectral transmittance (%) at a wavelength $\lambda_n$ nm by a green pixel of the color filter; and $I(\lambda_n)$ a relative emission intensity, normalized by a total emission intensity, at a wavelength $\lambda_n$ nm from the backlight, these satisfy the following conditions (5) and (6):

$$I(500\text{-}530) \times T^G(500\text{-}530) \geq 1.2 \tag{5}$$

$$T^G(580\text{-}600) \geq 20\% \tag{6}$$

wherein $T^G(500\text{-}530)$, $T^G(580\text{-}600)$ and $I(500\text{-}530)$ represent the average transmittances (%) at 500 nm $\leq \lambda_n \leq$ 530 nm and 580 nm $\leq \lambda_n \leq$ 600 nm and the average relative emission intensity at 500 nm $\leq \lambda_n \leq$ 530 nm, respectively, and $I(\lambda_n)$ is as defined in the above (D).

(H) A color image display device comprising a combination of light shutters, a color filter having color elements of at least three colors of red, green and blue corresponding to the light shutters, and a backlight for transmission illumination, wherein the backlight has a phosphor layer or a phosphor film, and the phosphor layer or the phosphor film contains a compound represented by the following formula (7), comprising a complex oxide containing bivalent, trivalent and tetravalent metal elements as a host material and containing at least Ce as an activator element in the host material:

$$M^1_{a'} M^2_{b'} M^3_{c'} O_{d'} \tag{7}$$

wherein $M^1$, $M^2$ and $M^3$ represent a bivalent metal element, a trivalent metal element and a tetravalent metal element, respectively, and a' to d' are numerical values within the following ranges:

$2.7 \leq a' \leq 3.3$ $1.8 \leq b' \leq 2.2$ $2.7 \leq c' \leq 3.3$ $11.0 \leq d' \leq 13.0$ (I) A color image display device comprising a combination of light shutters, a color filter having color elements of at least three colors of red, green and blue corresponding to the light shutters, and a backlight for transmission illumination, wherein the backlight has a phosphor layer or a phosphor film, and the phosphor layer or the phosphor film contains a compound represented by the following formula (8):

$$M^5{}_k M^6{}_l M^7{}_m O_n \quad (8)$$

wherein $M^5$, $M^6$ and $M^7$ represent an activator element containing at least Ce, a bivalent metal element and a trivalent metal element, respectively, and k to n are numerical values within the following ranges:

$$0.0001 \leq k \leq 0.2$$

$$0.8 \leq l \leq 1.2$$

$$1.6 \leq m \leq 2.4$$

$$3.2 \leq n \leq 4.8$$

(J) The color image display device according to any one of the above (A) to (F), comprising a combination of light shutters, a color filter having color elements of at least three colors of red, green and blue corresponding to the light shutters, and a backlight for transmission illumination, wherein a light source for the backlight comprises a combination of a blue or deep blue LED and a phosphor, and has at least one main component for emission in each of the wavelength regions of from 430 to 470 nm, from 500 to 540 nm, and from 600 to 680 nm.

(K) A color image display device comprising a combination of light shutters, a color filter having color elements of at least three colors of red, green and blue corresponding to the light shutters, and a backlight for transmission illumination, wherein a light source for the backlight comprises a combination of a blue or deep blue LED and a phosphor and has at least one main component for emission in each of the wavelength regions of from 430 to 470 nm, from 500 to 540 nm, and from 600 to 680 nm, and a color image display element has a color gamut of the NTSC percentage of at least 60%.

Effects of the Present Invention

According to the color liquid crystal display device of the present invention, such a color liquid crystal display device can be provided that reproduction of a deep red and green image can be realized without sacrifice of the brightness of the image even with a LED backlight, and high gamut over the entire image can be achieved, and further, red, green and blue emission is achieved by one chip, whereby productivity in mounting will not be impaired, and the white balance can be easily adjusted.

DESCRIPTION OF REFERENCE SYMBOLS

Figure 1:
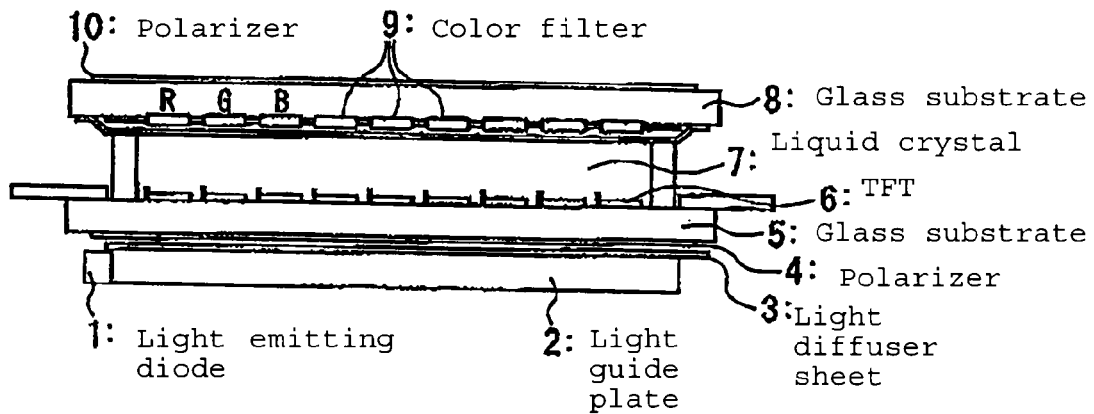
FIG. 1 is a view showing a configuration of a color liquid crystal display device of TFT type.

1 Light emitting diode
2 Light guide plate
3 Light diffuser sheet
4,10 Polarizers
5,8 Glass substrates
6 TFT
7 Liquid crystal
9 Color filter
11 Light guide
12 Array
13 Light control sheet
14,14' Light extracting mechanisms
15 Reflecting sheet

BEST MODE FOR CARRYING OUT THE INVENTION

Embodiments of the blue composition for a color filter, the color filter and the color liquid crystal display device of the present invention will be described below. These are an example of the embodiments of the present invention, and the present invention is not limited thereto.

(1) Blue Composition for Color Filter

The blue composition for a color filter of the present invention is a blue composition for a color filter, which comprises a binder resin (a) and/or a monomer (b) and a colorant (c), and is characterized in that its cured product has an average value $T^B(460\text{-}480)$ (%) of the spectrum transmittance at a wavelength at every interval of 5 nm in the visible light range of from 460 to 480 nm of at most 65%.

A cured product of the blue composition of the present invention, which has the above characteristics of the average spectrum transmittance, can shut off extra wavelengths in the blue region characteristic of a LED backlight, and further improves wide color gamut of the color image display device of the present invention as described in Chapter (3). $T^B(460\text{-}480)$ is preferably at most 60%, more preferably at most 58%. Further, it is usually at least 1%. If $T^B(460\text{-}480)$ is too high, lights with extra wavelengths characteristic of the LED backlight tends to be transmitted, thus impairing the color gamut. Further, if it is too low, even the transmittance of light in the vicinity of 450 nm as the main component for the blue color tends to decrease, thus decreasing the brightness of the blue pixel.

The composition of the blue composition of the present invention is not particularly limited so long as the blue composition has the above characteristics of the average spectral transmittance, but the characteristics can be secured by the following specific means.

Namely, a blue composition containing as the colorant (c) a dioxazine violet pigment and/or a copper phthalocyanine pigment has the above characteristics of the average spectral transmittance.

The dioxazine violet pigment may, for example, be pigments of the following pigment numbers. "C.I" indicates the color index (C.I.).

C.I. pigment violet 23, 19, etc.

The copper phthalocyanine pigment may, for example, be pigments of the following pigment numbers.

C.I. pigment blue 15:6, 15:3, 15:2, etc.

Further, the content of the dioxazine violet pigment to all the blue pigments is usually at least 25 wt %, preferably at least 30 wt %, more preferably at least 35 wt %. Further, it is usually at most 90 wt %. If the content of the dioxazine violet pigment is too low, $T^B$(460-480) will be too high, whereby too greenish blue will be obtained, thus decreasing the color purity. Further, if the content is too high, the transmittance of light in the vicinity of 450 nm as the main component for the blue light tends to be too low, thus decreasing the brightness of the blue pixel.

Further, the content of the copper phthalocyanine pigment to all the pigments is usually at least 10 wt %. Further, it is usually at most 75 wt %, preferably at most 70 wt %, more preferably at most 65 wt %. If the content of the copper phthalocyanine pigment is too low, the pixel tends to provide a less bluish color, thus decreasing the color purity. Further, if the content is too high, $T^B$(460-480) tends to be too high, whereby too greenish blue will be obtained, thus decreasing the color purity.

Further, the proportion of the content of the dioxazine violet pigment to the content of the copper phthalocyanine pigment is usually 25:75 to 75:25, preferably 30:70 to 70:30, more preferably 35:65 to 65:35. If the amount of the dioxazine violent pigment is too large as compared with the amount of the copper phthalocyanine pigment, the transmittance of light in the vicinity of 450 nm as the main component for the blue light tends to be too low, thus decreasing the brightness of the blue pixel. Further, if the amount of the dioxazine violet pigment is too small as compared with the amount of the copper phthalocyanine pigment, $T^B$(460-480) tends to be too high, whereby too greenish blue will be obtained, thus decreasing the color purity.

Other components to constitute the blue composition of the present invention, a production method therefor and the like will be described in Chapter (3-4) (Composition for color filter).

(2) Color Filter

The color filter of the present invention is characterized by having a pixel formed by the above blue composition. The color filter of the present invention can shut off extra wavelengths in the blue region characteristic of a LED backlight and further improve the wide color gamut of the color image display device of the present invention as described in Chapter (3). Thus, the blue pixel of the color filter of the present invention has an average value $T^B$(460-480) (%) of the spectral transmittance at a wavelength at every interval of 5 nm in the visible light range of from 460 to 480 nm of usually at most 65%, preferably at most 60%, more preferably at most 58%. Further, it is usually at least 1%. If $T^B$(460-480) is too high, lights with extra wavelengths characteristic of the LED backlight tend to be transmitted, thus impairing the color gamut. Further, if it is too low, even the transmittance of light in the vicinity of 450 nm as the main component for the blue color tends to decrease, thus decreasing the brightness of the blue pixel.

Further, when the color filter of the present invention is produced, the blue composition preferably contains a dioxazine violet pigment, and its content is as described in Chapter (1).

Further, in such a case, the content V (%) of the dioxazine violet pigment to the total solid content and the film thickness T (μm) after drying preferably satisfy the following formula:

$$VT \geq 10$$

VT is preferably at least 11, more preferably at least 12, and it is usually at most 90. If the value of VT is too small, $T^B$(460-480) tends to be too high, whereby too greenish blue will be obtained, thus decreasing the color purity, and if it is too high, the transmittance of light in the vicinity of 450 nm as the main component for the blue color tends to decrease, thus decreasing the brightness of the blue pixel.

Other components constituting the color filter of the present invention, a production method therefor and the like will be described in Chapter (3-3) (Color filter).

(3) Color Image Display Device

Now, the color image display device of the present invention will be explained.

The color image display device of the present invention comprises a combination of light shutters, a color filter having color elements of at least three colors of red, green and blue corresponding to the light shutters, and a backlight for transmission illumination, and its specific structure is not particularly limited. For example, a color liquid crystal display device of a TFT type wherein the light shutters employ liquid crystal as shown in FIG. 1 may be mentioned.

FIG. 1 shows an example of the color liquid crystal display device of a TFT (thin film transistor) type using a side-light type backlight device and a color filter. In this liquid crystal display device, light emitted from a light source 1 is converted into an area light source by a light guide plate 2, a light diffuser sheet 3 further enhances uniformity of the light, and the light then passes a prism sheet to enter a polarizer 4. For this incident light, a direction of polarization is controlled in each pixel by TFT 6 and thereafter the light is incident into a color filter 9. Finally, the light passes through a polarizer 10 with the direction of polarization perpendicular to that of the polarizer 4 and then reaches an observer. The degree of change of the polarization direction of the incident light varies depending upon an applied voltage to TFT 6, so as to change the quantity of light passing through the polarizer 10, thus enabling display of a color image. Numerals 5 and 8 denote transparent substrates (glass substrates), and 7 a liquid crystal.

Further, the color image display device of the present invention is characterized by having wide color gamut by the structure as described in detail below. Namely, the color image display device of the present invention comprises a combination of light shutters, a color filter having color elements of at least three colors of red, green and blue corresponding to the light shutters, and the backlight for transmission illumination, and is characterized in that a light source for the backlight comprises a combination of a blue or deep blue LED and a phosphor and has at least one main component for emission in each of the wavelength regions of from 430 to 470 nm, from 500 to 540 nm and from 600 to 680 nm, and a color image display element has a color gamut of the NTSC percentage of at least 60%. The NTSC percentage is preferably at least 70%.

Further, the color temperature of the color image display device of the present invention is usually from 5,000 to 10,000 K, preferably from 5,500 to 9,500 K, more preferably from 6,000 to 9,000 K. If the color temperature is too low, an entirely reddish image will be obtained, and if the color temperature is too high, the brightness tends to decrease.

(3-1) Backlight Device

First, the configuration of the backlight device used in the color liquid crystal display device as described above will be described below.

The backlight device used in the present invention is an area light source device disposed on a back face of a liquid crystal panel and used as a back light source means for a transmission type or semi-transmission type color liquid crystal display device.

As the configuration of the backlight device, it comprises a LED which emits white light, and a light unformalizing means for converting the light-source light into a nearly uniform area light source.

Typical examples of installation of the light source include a method of placing the light source immediately below the backlight of the liquid crystal elements (direct backlight system) and a method of placing the light source on a side face and using an optically transparent light guide such as an acrylic plate to convert the light into area light to obtain an area light source (side light system). Among them, the side light system as shown in FIGS. 2 and 3 is suitably applicable as an area light source being thin and excellent in uniformity of luminance distribution, and is now most commonly put to practical use.

Figure 2:
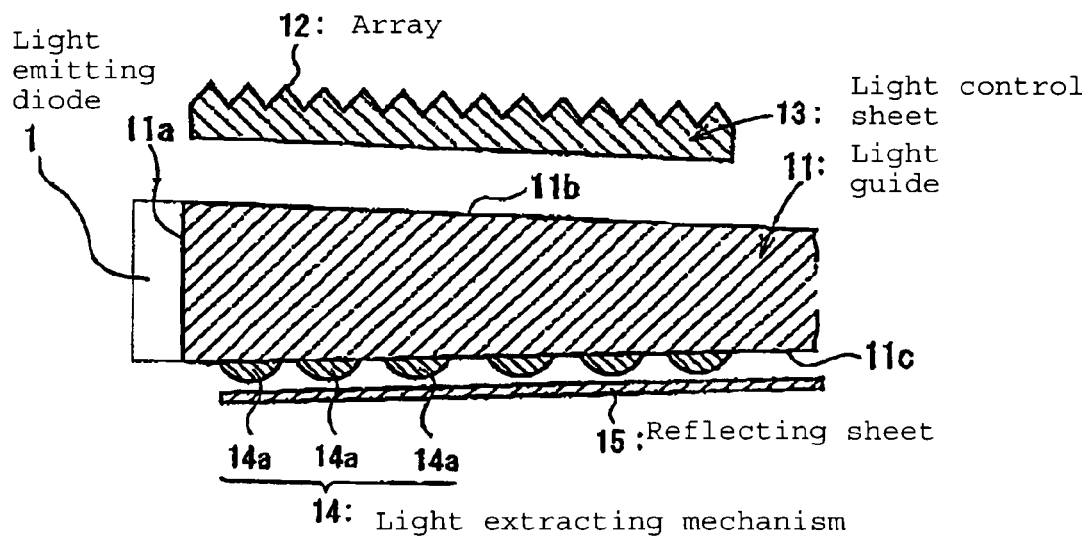
FIG. 2 is a sectional view showing an example of a backlight device suitable for the present invention.

The backlight device of FIG. 2 is configured so that a light emitting diode 1 is placed along one side end face 11*a* of a substrate consisting of an optically transparent flat plate, i.e. a light guide 11, and light is made incident through one side end face 11*a* as a light entrance face into the interior of the light guide 11. One surface 11*b* of the light guide 11 serves as a light exit face, and a light control sheet 13 with an array 12 of nearly triangle prism shape formed therein is place above the light exit face 11*b* so that apex angles of the array 12 are directed toward the observer. A light extracting mechanism 14 printed in a predetermined pattern of many dots 14*a* of light scattering ink is provided on the other face 11*c* opposite to the light exit face 11*b* in the light guide 11. On this face 11*c* side, a reflecting sheet 15 is provided in proximity to this face 11*c*.

Figure 3:
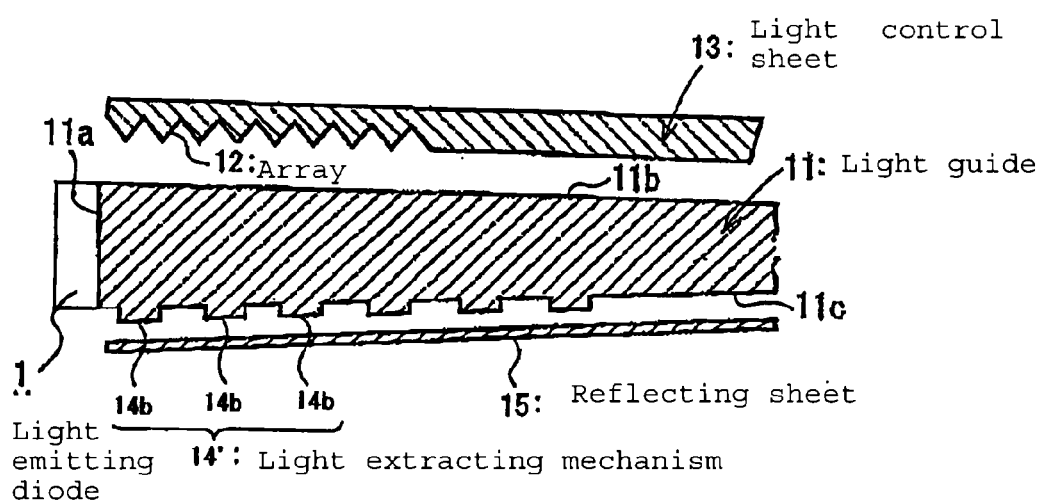
FIG. 3 is a sectional view showing another example of a backlight device suitable for the present invention.

The backlight device of FIG. 3 is constructed in much the same configuration as the backlight device shown in FIG. 2, except that the light control sheet 13 with the prism array 12 of nearly triangle prism shape formed therein is located so that the apex angles of the array 12 are directed toward the light exit face 11*b* of the light guide 11 and except that the light extracting mechanism 14' provided in the face 11*c* opposite to the light exit face 11*b* of the light guide 11 comprises a rough pattern 14*b* with each surface being formed as the rough surface.

By adopting the backlight devices of the side light system as described above, it is feasible to bring out the lightweight and low-profile features of the liquid crystal display device more effectively.

The light source of the backlight device of the present invention is characterized by containing a LED (hereinafter sometimes referred to as a light emitting diode optionally) in its structure. The light source can be any light source of the type providing emissions in the red, green and blue wavelength regions, i.e. in ranges of from 580 to 700 nm, from 500 to 550 nm, and from 400 to 480 nm.

In order that the backlight satisfies such conditions, such a method may be mentioned that the light source comprises a combination of a blue or deep blue LED and a phosphor, and is adjusted so that there is at least one main component for emission in each of the wavelength regions of the red region (usually from 600 to 680 nm, preferably from 610 to 680 nm, more preferably from 620 to 680 nm), the green region (usually from 500 to 540 nm, preferably from 500 to 530 nm, more preferably from 500 to 525 nm) and the blue region (usually from 430 to 470 nm, preferably from 440 to 460 nm).

The quantity of light in the respective red, green and blue regions at a transmission type or semi-transmission type transmission mode is determined by the product of the emission from the backlight and the spectral transmittance of the color filter. Accordingly, it is necessary to select such a backlight as to satisfy conditions as described in the item (c) colorant of the composition for a color filter.

Now, specific examples of the backlight device of the present invention will be described below, but the backlight light source of the present invention is not limited thereto so long as the above conditions are met.

The light source is preferably a light emitting diode. The emission wavelength of the light source is from 440 to 490 nm, preferably from 450 nm to 480 nm. As the light source, for example, InGaN, GaAlN, InGaAlN, ZnSeS semiconductor having crystals grown by e.g. a MOCVD method on a substrate of e.g. silicon carbide, sapphire or gallium nitride, is suitable. A plurality of the light sources may be used so as to obtain a high output. Further, the light source may be an end face emission type or face emission type laser diode.

A frame to fix the light source has at least positive and negative electrodes to supply electricity to the light source. A concave cup may be formed on the frame, and the light source is disposed on the bottom, whereby the emitted light can be made to have directivity, and light can be effectively utilized. Further, the inner face of the concave portion of the frame or the entire frame may be plated with a high reflective metal such as silver, platinum or aluminum or an alloy equal thereto, whereby the reflectance in the overall visible light range can be increased, and the efficiency of light can be increased. Further, the same effects will be obtained when the surface of the concave portion of the frame or the entire frame is made of a resin for injection molding, containing white glass fibers or a high reflective substance such as an alumina powder or a titania powder.

To fix the light source, an epoxy, imide, acrylic or another adhesive or a solder such as AuSn or AgSn is used. When electricity is supplied to the light source via an adhesive, it is preferred to thinly and uniformly coat one having an electrically conductive filler such as fine silver particles incorporated in an adhesive, such as a silver paste or a carbon paste. Particularly for a large electric current type light emitting diode or laser diode of which heat dispersion properties are important, a solder is effective. Further, any adhesive may be employed for fixation of a light source to which no electricity will be applied through an adhesive, but a silver paste or a solder is preferred considering heat dispersion properties.

The light source and the electrode of the frame are connected by wire bonding. As a wire, a gold or aluminum wire having a diameter of from 20 to 40 μm is used. As the method of connecting the light source and the electrode of the frame, a method employing flip chip bonding without using a wire may also be employed.

A phosphor emitting light in a green band and a phosphor emitting light in a red band are mixed with a transparent binder such as an epoxy resin or a silicone resin and coated on a light emitting diode. The proportion of mixing may optionally be changed so as to obtain a desired chromaticity. Further, the phosphor emitting light in a green band and the phosphor emitting light in a red band may be separately coated on a light emitting diode. When a dispersing agent is further added to the transparent binder, the emitted light can be made more uniform. The dispersing agent is preferably a colorless substance having an average particle size of from 100 nm to several dozen μm. Alumina, zirconia, yttria and the like are preferred since they are stable at a temperature range of from −60 to 120° C. at which they are used. A dispersing agent having a high refractive index is more preferred, which provides a higher effect.

When electricity is applied to a finished light emitting device, first, the light emitting diode emits a blue or deep blue light. The phosphor absorbs part of the light and emits a light in a green band or in a red band. As a light emitted from the light emitting device, a substantially white light is obtained, formed by mixing the original light in a blue band from the light emitting diode and lights in a green band and in a red band, the wavelengths of which are converted by the phosphor.

(3-2) Phosphor

Now, the phosphor will be explained below. In the color liquid crystal display device of the present invention, preferably the above-described backlight has a phosphor layer or a phosphor film, and the phosphor layer or the phosphor film employs the following phosphor.

(3-2-1) Red Phosphor

As a red phosphor used for the phosphor layer or the phosphor film to be used for the color liquid crystal display device of the present invention, various phosphors having an emission peak wavelength within a wavelength range of 620 nm$\leq \lambda_n \leq$680 nm can be used. As such a red phosphor to realize an image with high color purity, a phosphor activated with europium is preferred. The phosphor activated with europium may be nitride phosphor, an oxynitride phosphor, a sulfide phosphor or an oxysulfide phosphor, and among them, preferred is a nitride phosphor or an oxynitride phosphor.

Now, specific examples of preferred red phosphors will be explained below.

(3-2-1-1)

As a specific example, a compound represented by the formula (3) may be mentioned:

$$Eu_a Ca_b Sr_c M_d S_e \qquad (3)$$

wherein M represents at least one element selected from Ba, Mg and Zn, and a to e are numerical values within the following ranges:

$0.0002 \leq a \leq 0.02$ $0.3 \leq b \leq 0.9998$ d is $0 \leq d \leq 0.1$ $a+b+c+d=1$ $0.9 \leq e \leq 1.1$ In view of the heat stability, the chemical formula weight a of Eu in the formula (3) is preferably within a range of $0.0002 \leq a \leq 0.02$, more preferably $0.0004 \leq a \leq 0.02$. In view of the temperature characteristics, the chemical formula weight a of Eu in the formula (3) is preferably within a range of $0.0004 \leq a \leq 0.01$, more preferably $0.0004 \leq a \leq 0.007$, furthermore preferably $0.0004 \leq a < 0.005$, still more preferably $0.0004 \leq a \leq 0.004$.

In view of emission intensity, the chemical formula a of Eu in the formula (3) is preferably within a range of $0.0004 \leq a \leq 0.02$, more preferably $0.001 \leq a \leq 0.008$. If the content of the emission center ion $Eu^{2+}$ is too low, the emission intensity tends to be low, and if it is too high, the emission intensity also tends to decrease due to a phenomenon called concentration quenching.

As the preferred range of the chemical formula weight a of Eu in the formula (3) which satisfies all the heat stability, the temperature characteristics and the emission intensity, it is preferably within a range of $0.0004 \leq a \leq 0.004$, more preferably $0.001 \leq a \leq 0.004$.

In the basic crystal $Eu_a Ca_b Sr_c M_d S_e$ in the above formula (3), the molar ratio of the cation site occupied by Eu, Ca, Sr and M and the anion site occupied by S is 1:1, but the aimed phosphor performance will not significantly be influenced even when a cation defect or an anion defect somewhat occurs, and accordingly, a basic crystal of the above formula (3) with a molar ratio e of the anion site occupied by S within a range of at least 0.9 and at most 1.1 can be used.

In the chemical substance of the above formula (3), M representing at least one element selected from Ba, Mg, and Zn is not necessarily essential in the present invention, but the object of the present invention can be achieved even when it is contained in the chemical substance of the above formula (3) with a molar ratio d of M within a range of $0 \leq d \leq 0.1$.

There will be no practical problem even when the chemical substance of the above formula (3) contains an element other than Eu, Ca, Sr, Ba, Mg, Zn and S in an amount up to 1% as an impurity.

(3-2-1-2)

Further, as another example, the following compound may be mentioned.

A compound containing at least element $M^4$, element A, element D, element E and element X (wherein $M^4$ is one or at least two elements selected from the group consisting of Mn, Ce, Pr, Nd, Sm, Eu, Tb, Dy, Ho, Er, Tm and Yb and contains at least Eu, A is one or at least two elements selected from the group consisting of bivalent metal elements other than the element $M^4$, D is one or at least two elements selected from the group consisting of tetravalent metal elements, E is one or at least two elements selected from the group consisting of trivalent metal elements, and X is one or at least two elements selected from the group consisting of O, N and F).

The above compound is particularly preferred from such a viewpoint that a light emitting element is less likely to deteriorate during its use, and the change in brightness due to a change in the temperature at which the light emitting element is used is small, whereby a high brightness and high color rendering light emitting element can be obtained.

Further, $M^4$ is one or at least two elements selected from the group consisting of Mn, Ce, Pr, Nd, Sm, Eu, Tb, Dy, Ho, Er, Tm and Yb and contains at least Eu, and among them, it is preferably one or at least two elements selected from the group consisting of Mn, Ce, Sm, Eu, Tb, Dy, Er, and Yb, and it is more preferably Eu.

A is one or at least two elements selected from the group consisting of bivalent metal elements other than the element $M^4$, and among them, it is preferably one or at least two elements selected from the group consisting of Mg, Ca, Sr and Ba, more preferably Ca.

D is one or at least two elements selected from the group consisting of tetravalent metal elements, and among them, it is preferably one or at least two elements selected from the group consisting of Si, Ge, Sn, Ti, Zr and Hf, more preferably Si.

E is one or at least two elements selected from the group consisting of trivalent metal elements, and among them, it is preferably one or at least two elements selected from the group consisting of B, Al, Ga, In, Sc, Y, La, Gd and Lu, more preferably Al.

X is one or at least two elements selected from the group consisting of O, N and F, and among them, it is preferably N, or N and O.

A specific example of the compositional formula of the above composition is represented by the following formula (4):

$$M^4{}_f A_g D_h E_i X_j \qquad (4)$$

wherein f to j are numerical values within the following ranges:

$$0.00001 \leq f \leq 0.1$$

$$f+g=1$$

$$0.5 \leq h \leq 4$$

$$0.5 \leq i \leq 8$$

$$0.8 \times (2/3+4/3 \times h+i) \leq j$$

$$j \leq 1.2 \times (2/3+4/3 \times h+i)$$

f represents the amount of addition of emission center element $M^4$ and is preferably such that the ratio f of the number of atoms of $M^4$ to ($M^4$+A) (provided that $f=M^4/(M^4+A)$) in the phosphor is at least 0.00001 and at most 0.1. If the value f is smaller than 0.00001, the number of atoms of $M^4$ as the emission center is small, whereby the emission brightness tends to decrease. If the value f is larger than 0.1, the concentration quenching due to interference between $M^4$ ions tends to occur, thus decreasing the brightness.

Particularly when $M^4$ is Eu, the value f is preferably at least 0.002 and at most 0.03 in view of high emission brightness.

The value h represents the content of the element D such as Si and is a value represented by $0.5 \leq h \leq 4$. It is preferably $0.5 \leq h \leq 1.8$, more preferably h=1. If the value h is smaller than 0.5 or larger than 4, the emission brightness tends to decrease. A high emission brightness will be obtained within a range of $0.5 \leq h \leq 1.8$, and a particularly high emission brightness will be obtained when h=1.

The value i represents the content of the element E such as Al and is a value represented by $0.5 \leq i \leq 8$. It is preferably $0.5 \leq i \leq 1.8$, more preferably i=1. If the value i is smaller than 0.5 or larger than 8, the emission brightness tends to decrease. A high emission brightness will be obtained within a range of $0.5 \leq i \leq 1.8$, and a particularly high emission brightness will be obtained when i=1.

The value j represents the content of the element X such as N and is such a value that it is at least $0.8 \times (2/3+4/3 \times h+i)$ and at most $1.2 \times (2/3+4/3 \times h+i)$. More preferably, j=3. The emission brightness tends to decrease out of this range of the value j.

Among the above compositions, a preferred composition with high emission brightness is an inorganic compound wherein at least the element $M^4$ contains Eu, the element A contains Ca, the element D contains Si, the element E contains Al and the element X contains N. Particularly, it is an inorganic compound wherein the element $M^4$ is Eu, the element A is Ca, the element D is Si, the element E is Al and the element X is N or a mixture of N and O.

In a case where the element X is N or a mixture of N and O, the emission intensity tends to decrease if (the number of moles of O)/(the number of moles of N+the number of moles of O) is too high. In view of the emission intensity, (the number of moles of O)/(the number of moles of N+the number of moles of O) is preferably at most 0.5, more preferably at most 0.3, and furthermore preferably at most 0.1, whereby a red phosphor with favorable color purity, having an emission peak wavelength in an emission wavelength of from 640 to 660 nm will be obtained.

(3-2-2) Green Phosphor

As a green phosphor used for the phosphor layer or the phosphor film to be used for the color liquid crystal display device of the present invention, various phosphors having an emission peak wavelength within a wavelength range of 500 nm$\leq \lambda_n \leq$530 nm can be used. Such a green phosphor to realize an image with high color purity preferably contains a phosphor activated with cerium and/or europium. The phosphor activated with cerium and/or europium may be an oxide phosphor, a nitride phosphor or an oxynitride phosphor, and among them, preferred is an oxide phosphor activated with cerium or an oxynitride phosphor activated with europium.

Further, a phosphor having a garnet crystal structure as the crystal structure is preferred, which tends to be excellent in view of e.g. heat resistance.

Now, specific examples of preferred green phosphors will be explained below.

(3-2-2-1)

As a specific example, a compound represented by the formula (7), comprising a complex oxide containing bivalent, trivalent and tetravalent metal elements as the host material and containing at least Ce as an activator element in the host material:

$$M^1{}_{a'} M^2{}_{b'} M^3{}_{c'} O_{d'} \qquad (7)$$

wherein $M^1$, $M^2$ and $M^3$ represent a bivalent metal element, a trivalent metal element and a tetravalent metal element, respectively, and a' to d' are numerical values within the following ranges:

$$2.7 \leq a' \leq 3.3$$

$$1.8 \leq b' \leq 2.2$$

$$2.7 \leq c' \leq 3.3$$

$$11.0 \leq d' \leq 13.0$$

In the formula (7), $M^1$ is a bivalent metal element, and in view of e.g. the emission efficiency, it is preferably at least one element selected from the group consisting of Mg, Ca, Zn, Sr, Cd and Ba, more preferably Mg, Ca or Zn, particularly preferably Ca. In this case, Ca may be a simple substance or a complex with Mg. Basically, $M^1$ preferably comprises the above preferred element, but may contain another bivalent metal element within a range not to impair the performance.

Further, in the formula (7), $M^2$ is a trivalent metal element, and from a similar viewpoint, it is preferably at least one element selected from the group consisting of Al, Sc, Ga, Y, In, La, Gd and Lu, more preferably Al, Sc, Y or Lu, particularly preferably Sc. In this case, Sc may be a simple substance or a complex with Y or Lu. Basically, $M^2$ preferably comprises the above preferred element but may contain another trivalent metal element within a range not to impair the performance.

Further, in the formula (7), $M^3$ is a tetravalent metal element, and from a similar viewpoint, it preferably contains at least Si, and usually at least 50 mol %, preferably at least 70 mol %, more preferably at least 80 mol %, particularly preferably at least 90 mol %, of the tetravalent metal element represented by $M^3$ is Si. The tetravalent metal element $M^3$ other than Si is preferably at least one element selected from the group consisting of Ti, Ge, Zr, Sn and Hf, more preferably at least one element selected from the group consisting of Ti, Zr, Sn and Hf, particularly preferably Sn. Particularly preferably, $M^3$ is Si. Basically, $M^3$ preferably comprises the above preferred element, but may contain another tetravalent metal element within a range not to impair the performance.

In the present invention, "containing another element within a range not to impair the performance" means that such an element is contained in an amount of usually at most 10 mol %, preferably at most 5 mol %, more preferably at most 1 mol %, based on each of the $M^1$, $M^2$, and $M^3$.

Further, in the formula (7), a', b', c' and d' are numerical values within ranges of $2.7 \leq a' \leq 3.3$, $1.8 \leq b' \leq 2.2$, $2.7 \leq c' \leq 3.3$ and $11.0 \leq d' \leq 13.0$. a' to d' of the present phosphor vary within the above ranges in accordance with whether the emission center ion element replaces the position of the crystal lattice of any one of the metal elements $M^1$, $M^2$, and $M^3$ or it is interstitially disposed. However, the present phosphor has a garnet crystal structure and commonly has a body-centered cubic lattice crystal structure wherein a'=3, b'=2, c'=3 and d'=12.

Further, as the emission center ion (activator element) contained in the host material of this crystal structure, at least Ce is contained, but at least one bivalent to tetravalent element selected from the group consisting of Cr, Mn, Fe, Co, Ni, Cu, Pr, Nd, Sm, Eu, Tb, Dy, Ho, Er, Tm and Yb can be incorporated as a co-activator so as to finely adjust the emission characteristics. Particularly, at least one bivalent to tetravalent element selected from the group consisting of Mn, Fe, Co, Ni, Cu, Sm, Eu, Tb, Dy and Yb can be incorporated, and bivalent Mn, bivalent or trivalent Eu or trivalent Tb can be suitably be added. When a co-activator is incorporated, the amount of the co-activator is usually from 0.01 to 20 mol per mol of Ce.

(3-2-2-2)

Further, as another specific example, the following compound may be mentioned:

$$M^5_k M^6_l M^7_m O_n \qquad (8)$$

wherein $M^5$, $M^6$ and $M^7$ represent an activator element containing at least Ce, a bivalent metal element and a trivalent metal element, respectively, and k to n are numerical values within the following ranges:

$0.0001 \leq k \leq 0.2$ $0.8 \leq l \leq 1.2$ $1.6 \leq m \leq 2.4$ $3.2 \leq n \leq 4.8$ In the formula (8), $M^5$ is an activator element to be incorporated in the crystal host material as described hereinafter and contains at least Ce, and at least one bivalent to tetravalent element selected from the group consisting of Cr, Mn, Fe, Co, Ni, Cu, Ce, Pr, Nd, Sm, Eu, Tb, Dy, Ho, Er, Tm and Yb can be incorporated as a co-activator for the purpose adjusting long persistent phosphorescence or chromaticity, increasing sensitivity, or the like. When such an element is incorporated as a co-activator, the amount of the co-activator is usually from 0.01 to 20 mol % per mol of Ce.

The concentration k of the activator element $M^5$ is $0.0001 \leq k \leq 0.2$. If the value k is too small, the amount of the emission center ion present in the crystal host material of the phosphor tends to be too small, and the emission intensity tends to be low. On the other hand, if the value k is too large, the emission intensity tends to be small due to the concentration quenching. Accordingly, in view of the emission intensity, k is preferably $0.0005 \leq k \leq 0.1$, most preferably $0.002 \leq k \leq 0.04$. Further, the emission peak wavelength tends to shift to the long wavelength side and the quantity of the green light with high eye spectral sensitivity relatively increases along with an increase in the Ce concentration. Accordingly, in view of the balance between the emission intensity and the emission peak wavelength, k is preferably $0.004 \leq k \leq 0.15$, more preferably $0.008 \leq k \leq 0.1$, most preferably $0.02 \leq k \leq 0.08$.

In the formula (8), $M^6$ is a bivalent metal element, and in view of e.g. the emission efficiency, it is preferably at least one element selected from the group consisting of Mg, Ca, Zn, Sr, Cd and Ba, more preferably Mg, Ca or Sr, and it is particularly preferred that at least 50 mol % of the element $M^6$ is Ca.

In the formula (8), $M^7$ is a trivalent metal element, and from a similar viewpoint, it is preferably at least one element selected from the group consisting of Al, Sc, Ga, Y, In, La, Gd, Yb and Lu, more preferably Al, Sc, Yb or Lu, furthermore preferably Sc, or Sc and Al, or Sc and Lu, and it is particularly preferred that at least 50 mol % of the element $M^7$ is Sc.

The host material crystal of the phosphor is commonly a crystal represented by a compositional formula $M^6 M^7_2 O_4$ comprising $M^6$ which is a bivalent metal element, $M^7$ which is a trivalent metal element and oxygen, and accordingly the chemical compositional ratio is commonly such that l is 1, m is 2 and n is 4 in the formula (8). However, in the present invention, it is not necessarily the case that l is 1, m is 2 and n is 4 in the formula (8) in accordance with whether the activator element Ce replaces the position of the crystal lattice of either one of the metal elements $M^6$ and $M^7$, or it is interstitially disposed. Accordingly, l, m and n are numerical values within ranges of $0.8 \leq l \leq 1.2$, $1.6 \leq m \leq 2.4$ and $3.2 \leq n \leq 4.8$. Further, l and m are preferably numerical values within ranges of $0.9 \leq l \leq 1.1$ and $1.8 \leq m \leq 2.2$ and n is preferably within a range of $3.6 \leq n \leq 4.4$. Further, $M^6$ and $M^7$ represent bivalent and trivalent metal elements, respectively, but it is possible to replace a very small part of $M^6$ and/or $M^7$ with a monovalent, tetravalent or pentavalent metal element to adjust e.g. the charge balance so long as there is no essential difference in view of e.g. the emission characteristics or the crystal structure. Further, a very small amount of an anion such as a halogen element (F, Cl, Br or I), nitrogen, sulfur, or selenium may be contained in the compound.

This substance is excited by a light of from 420 to 480 nm, and most efficiently excited by a light of from 440 to 470 nm. The emission spectrum has a peak in a range of from 490 to 550 nm, and has a wavelength component in a range of from 450 to 700 nm.

(3-2-2-3)

As other specific examples of preferred green phosphors, $MSi_2N_2O_2$ activated with europium (wherein M is one or at least two types of alkaline earth metals) and β-SiAlON activated with europium, disclosed in "Succeeded in development of green phosphor for white LED" as a paper for Tsukuba Science City Press Club, Education and Science Press Club and Science Press Club, published by National Institute for Material Science on Mar. 23, 2005, may, for example, be mentioned.

(3-3) Color Filter

The color filter to be used for the color image display device of the present invention is not particularly limited, but the following one may be used for example. In such a case, it is preferred to use the color filter as disclosed in the above-described Chapter (2) characterized in the blue pixel of the color filter.

The color filter is a filter obtained by forming fine pixels of red, green, blue and so on on a transparent substrate of glass or the like by a method of dyeing, printing, electrodeposition, pigment dispersion, or the like. In order to block leaking light between these pixels and obtain images with higher quality, it is often the case to provide a light shielding pattern called a black matrix between pixels.

A color filter by dyeing is fabricated as follows: an image is formed by a photosensitive resin obtained by mixing a dichromate as a photosensitive agent into gelatin, polyvinyl alcohol, or the like, followed by dyeing. A color filter by printing is fabricated by transferring a heat-curing or photo-curing ink onto a transparent substrate of glass or the like by such a method as screen printing, gravure printing, flexographic printing, transfer printing or soft lithography (imprint lithography). A color filter by electrodeposition is formed by electrophoresis effected while a transparent substrate of glass or the like with an electrode thereon is immersed in a bath containing a pigment or a dye. A color filter by pigment dispersion is formed by applying a composition in which a colorant such as a pigment is dispersed or dissolved in a photosensitive resin, onto a transparent substrate of glass or the like to form a coating film thereon, exposing the coating film to radiation through a photomask to effect exposure, and removing unexposed portions by a development process to form a pattern. The color filter can also be fabricated by other methods than these, including a method of applying a polyimide type resin composition in which a colorant is dispersed or dissolved, and forming a pixel image by etching, a method of attaching a film coated with a resin composition containing a colorant, to a transparent substrate, peeling it off, and effecting image exposure and development to form a pixel image, a method of forming a pixel image by an ink jet printer, and so on.

In the recent years, the pigment dispersion method is mainstream in fabrication of the color filters for liquid crystal display elements by virtue of its high productivity and excellent microfabrication property, but the color filter according to the present invention can be fabricated by any one of the above-mentioned production methods.

Examples of methods of forming the black matrix include a method of forming a chromium and/or chromium oxide (single-layer or multi-layer) film over an entire surface of a transparent substrate of glass or the like by a method such as sputtering, and thereafter removing only color pixel portions by etching, a method of applying a photosensitive composition in which a light shielding component is dispersed or dissolved, onto a transparent substrate of glass or the like to form a coating film, exposing the coating film to radiation through a photomask to effect exposure, and removing unexposed portions by development to form a pattern, and so on.

(3-3-1) Method of Production of Color Filter

Now, specific examples of the method of production of the color filter according to the present invention will be described below. A color filter according to the present invention can be produced usually by forming red, green and blue pixel images on a transparent substrate provided with a black matrix.

There are no particular restrictions on the material of the transparent substrate. Examples of the material include thermoplastic plastic sheets of polyesters such as polyethylene terephthalate, polyolefins such as polypropylene, polyethylene, etc., polycarbonate, polymethyl methacrylate, and polysulfone; heat curable plastic sheets of epoxy resins, unsaturated polyester resins, poly(meth)acrylate type resins, etc.; various glass sheets; or the like. Among these, preferred materials are the glass sheets and heat-resisting plastics in respect of heat resistance.

For an improvement in the physical properties including the adhesion property of the surface and others, the transparent substrate may be preliminarily treated by a corona discharge treatment, an ozone treatment, a thin film treatment with various polymers such as a silane coupling agent and a urethane polymer, and so on.

The black matrix is formed on the transparent substrate, utilizing a metal thin film or a pigment dispersion liquid for the black matrix.

The black matrix utilizing the metal thin film is formed, for example, of a single layer of chromium or two layers of chromium and a chromium oxide. In this case, first, a thin film or thin films of these metal or metal-metal oxide are formed on the transparent substrate by evaporation or sputtering or the like. Subsequently, a photosensitive film is formed thereon, and then the photosensitive film is exposed with a photomask having repeated patterns of stripes, a mosaic, triangles, or the like, and developed to form a resist image. Thereafter, the thin film is subjected to etching, thereby forming the black matrix.

Where the pigment dispersion liquid for the black matrix is utilized, the black matrix is formed using a composition for a color filter containing a black colorant as a colorant. For example, the black matrix is formed by using a single black colorant or a plurality of black colorants such as carbon black, bone black, graphite, iron black, aniline black, cyanine black, black titanium oxides, and so on, or using a composition for a color filter containing a black colorant made by mixture of red, green, blue, etc. properly selected from inorganic or organic pigments and dyes, and by employing a method similar to the below-described method of forming a red, green or blue pixel image.

The aforementioned composition for a color filter containing a colorant of one color out of red, green and blue is applied and dried on the transparent substrate with the black matrix thereon. Then, a photomask is placed on the coating thus obtained, and the coating is subjected to image exposure through the photomask, development, and heat-curing or photo-curing according to need to form a pixel image, thereby preparing a color layer. This operation is carried out for each of the compositions for a color filter of three colors of red, green and blue, thereby forming a color filter image.

The application of the compositions for a color filter can be made by such applicators as a spinner, a wire bar, a flow coater, a die coater, a roll coater and a spray.

The drying after the application may be conducted with a hot plate, an IR oven, a convection oven, or the like. The higher the temperature of the drying, the better the adhesion to the transparent substrate. However, too high temperatures tend to decompose the photopolymerization initiation system, induce thermal polymerization, and result in development failure. Therefore, the drying temperature is usually selected in a range of from 50 to 200° C., preferably in a range of from 50 to 150° C. A drying time is usually selected in a range of from 10 seconds to 10 minutes, preferably in a range of from 30 seconds to 5 minutes. It is also possible to apply a drying method by depressurization, prior to these drying methods by heat.

The thickness of the coating after dried is usually in a range of from 0.5 to 3 μm, preferably in a range of from 1 to 2 μm.

In cases where the composition for a color filter used comprises a combination of a binder resin and an ethylenic compound and where the binder resin is an acrylic resin having an ethylenic double bond and a carboxyl group in its side chain, it has very high sensitivity and high resolving power and is thus preferable in that an image can be formed by exposure and development without provision of an oxygen shielding layer of polyvinyl alcohol or the like.

There are no particular restrictions on an exposure light source that can be applied to the image exposure; for example, applicable light sources include lamp light sources such as xenon lamps, halogen lamps, tungsten lamps, high-pressure mercury lamps, ultrahigh-pressure mercury lamps, metal halide lamps, middle-pressure mercury lamps, low-pressure mercury lamps, carbon arc lamps and fluorescent lamps, laser light sources such as argon ion lasers, YAG lasers, excimer lasers, nitrogen lasers, helium cadmium lasers and semiconductor lasers, and so on. For using only a specific wavelength, an optical filter can be used.

After completion of the image exposure with such a light source, the coating is developed with an aqueous solution containing an organic solvent or containing a surfactant and an alkaline chemical, thereby forming an image on the substrate. This aqueous solution may further contain an organic solvent, a buffer, a dye or a pigment.

There are no particular restrictions on a developing process; the development is conducted at a development temperature usually in a range of from 10 to 50° C., preferably in a range of from 15 to 45° C., and by such a method as, dipping development, spray development, brush development, ultrasonic development, or the like.

Examples of the alkaline chemical to be used in the development include inorganic alkaline chemicals such as sodium silicate, potassium silicate, sodium hydroxide, potassium hydroxide, lithium hydroxide, sodium tertiary phosphate, sodium secondary phosphate, sodium carbonate, potassium carbonate, sodium bicarbonate, etc.; and organic amines such as trimethylamine, diethylamine, isopropyl amine, n-butylamine, monoethanolamine, diethanolamine, triethanolamine, tetraalkylammonium hydroxide, etc., which can be used alone or in combination of two or more.

Examples of the surfactant to be applicable include non-ionic surfactants such as polyoxyethylene alkyl ethers, polyoxyethylene alkyl aryl ethers, polyoxyethylene alkyl esters, sorbitan alkyl esters, monoglyceride alkyl esters, etc.; anionic surfactants such as alkylbenzenesulfonates, alkylnaphthalenesulfonates, alkylsulfates, alkylsulfonates, sulfosuccinates, etc.; and amphoteric surfactants such as alkylbetaines, amino acids, etc.

In either of the cases of the organic solvent being used alone and in combination with an aqueous solution, the organic solvent can be selected, for example, from isopropyl alcohol, benzyl alcohol, ethyl cellosolve, butyl cellosolve, phenyl cellosolve, propylene glycol, diacetone alcohol, and so on.

(3-4) Composition for Color Filter

There are no particular restrictions on a composition (resist) for a color filter to be used for the color image display device of the present invention, and the following ones may be used for example. In such a case, in order to prepare a blue pixel for a color filter, it is preferred to use the blue composition for a color filter as disclosed in the above-described Chapter (1).

Raw materials for production of the color filter will be described below, using an example of the pigment dispersion method which is recently mainstream.

The pigment dispersion method uses a composition in which a colorant such as a pigment is dispersed in a photosensitive resin as described above (hereinafter called a "composition for color filter"). This composition for color filter is generally a color composition for a color filter in which a binder resin (a) and/or a monomer (b), a colorant (c) and other components (d) as constituents are dissolved or dispersed in a solvent.

Each of the constituents will be described below in detail. In the description below, "(meth)acryl", "(meth)acrylate" and "(meth)acrylol" mean "acryl or methacryl", "acrylate or methacrylate" and "acrylol or methacrylol" respectively.

(a) Binder Resin

Where a binder resin is used singly, an appropriate one is properly selected in consideration of an image forming property and performance to be targeted, a production method desired to adopt, and so on. Where a binder resin is used in combination with a monomer described later, the binder resin is added in order to modify the composition for a color filter and improve the physical properties after photo-curing. In this case, therefore, a binder resin is properly selected according to a purpose of an improvement in compatibility, a film forming property, a development property, an adhesion property, or the like.

The binder resins usually used may, for example, be homopolymers or copolymers of (meth)acrylic acid, (meth)acrylates, (meth)acrylamide, maleic acid, (meth)acrylonitrile, styrene, vinyl acetate, vinylidene chloride, maleimide, and so on, polyethylene oxides, polyvinyl pyrrolidones, polyamides, polyurethanes, polyesters, polyethers, polyethylene terephthalates, acetylcelluloses, novolak resins, resol resins, polyvinyl phenols, polyvinyl butyrals, and so on.

Among these binder resins, preferred binder resins are those having a carboxyl group or a phenolic hydroxyl group in a side chain or in the main chain thereof. Development in an alkali solution becomes possible with use of the resins having these functional groups. Among them, preferred binder resins are resins having a carboxyl group, which have a high alkali development property; for example, (co)polymers of acrylic acid, resins of styrene/maleic anhydride, resins of novolak epoxy acrylate modified with an acid anhydride, and so on.

Particularly preferred binder resins are (co)polymers containing (meth)acrylic acid or a (meth)acrylate having a carboxyl group (these will be referred to as "acrylic resins" in the present specification). Namely, these acrylic resins are preferred in terms of easy controllability of performance and a production method because they are excellent in the development property and transparency and can provide various copolymers from a wide range of monomers.

Specific examples of the acrylic resins include resins that comprise, as an essential component, (meth)acrylic acid and/or a compound obtained by adding an acid (anhydride), such as (anhydrous)succinic acid, (anhydrous)phthalic acid, (anhydrous)maleic acid, or the like, to a hydroxyalkyl(meth)acrylate, such as succinic acid (2-(meth)acryloyloxyethyl)ester, adipic acid (2-acryloyloxyethyl)ester, phthalic acid (2-(meth)acryloyloxyethyl)ester, hexahydrophthalic acid (2-(meth)acryloyloxyethyl)ester, maleic acid (2-(meth)acryloyloxyethyl)ester, succinic acid (2-(meth)acryloyloxypropyl)ester, adipic acid (2-(meth)acryloyloxypropyl)ester, hexahydrophthalic acid (2-(meth)acryloyloxypropyl)ester, phthalic acid (2-(meth)acryloyloxypropyl)ester, maleic acid (2-(meth)acryloyloxypropyl)ester, succinic acid (2-(meth)acryloyloxybutyl) ester, adipic acid (2-(meth)acryloyloxybutyl)ester, hexahydrophthalic acid (2-(meth)acryloyloxybutyl)ester, phthalic acid (2-(meth)acryloyloxybutyl)ester, maleic acid (2-(meth)acryloyloxybutyl)ester, or the like; and that are copolymerized, if necessary, with one of various monomers, e.g., styrene type monomers such as styrene, α-methylstyrene, vinyltoluene, and so on; unsaturated group-containing carboxylic acids such as cinnamic acid, maleic acid, fumaric acid, maleic anhydride, itaconic acid, and so on; (meth)acrylates such as methyl(meth)acrylate, ethyl(meth)acrylate, propyl(meth)acrylate, allyl(meth)acrylate, butyl(meth)acrylate, 2-ethylhexyl(meth)acrylate, hydroxyethyl(meth)acrylate, hydroxypropyl(meth)acrylate, benzyl(meth)acrylate, hydroxyphenyl(meth)acrylate, methoxyphenyl(meth)acrylate, and so on; compounds obtained by adding to (meth) acrylic acid, one of lactones such as ε-caprolactone, β-propiolactone, γ-butyrolactone, δ-valerolactone, and so on; acrylonitrile; acrylamides such as (meth)acrylamide, N-methylolacrylamide, N,N-dimethylacrylamide, N-methacryloyl morpholine, N,N-dimethylaminoethyl(meth)acrylate, N,N-dimethylaminoethylacrylamide, and so on; vinyl acids such as vinyl acetate, vinyl versatate, vinyl propionate, vinyl cinnamate, vinyl pivalate, and so on.

For a purpose of increasing the strength of the coating film, acrylic resins preferably used are those obtained by copolymerization of from 10 to 98 mol %, preferably from 20 to 80 mol %, more preferably from 30 to 70 mol % of one of monomers having a phenyl group, such as styrene, α-methylstyrene, benzyl(meth)acrylate, hydroxyphenyl(meth)acrylate, methoxyphenyl(meth)acrylate, hydroxyphenyl(meth) acrylamide, hydroxyphenyl(meth)acrylsulfoamide, and so on, and from 2 to 90 mol %, preferably from 20 to 80 mol %, more preferably from 30 to 70 mol % of at least one monomer selected from the group consisting of (meth)acrylic acid, and (meth)acrylates having a carboxyl group, such as succinic acid (2-(meth)acryloyloxyethyl)ester, adipic acid (2-acryloyloxyethyl)ester, phthalic acid (2-(meth)acryloyloxyethyl)ester, hexahydrophthalic acid (2-(meth)acryloyloxyethyl)ester, maleic acid (2-(meth)acryloyloxyethyl)ester, and so on.

In addition, these resins preferably have an ethylenic double bond in a side chain. By using a binder resin having a double bond in a side chain, the photo-curing property of the composition for a color filter obtained is enhanced, whereby it is feasible to further improve the resolving property and adhesion property.

Means for introducing an ethylenic double bond into a binder resin include, for example, methods disclosed in JP-B-50-34443, JP-B-50-34444, and so on; i.e., a method of reacting a compound having both glycidyl group or epoxy cyclohexyl group and (meth)acryloyl group with a carboxylic group of a resin, and a method of reacting an acrylic acid chloride or the like with a hydroxyl group of a resin.

For example, a binder resin having an ethylenic double bond in a side chain is obtained by reacting a compound, such as glycidyl(meth)acrylate, allyl glycidyl ether, glycidyl α-ethylacrylate, crotonyl glycidyl ether, (iso)crotonic acid glycidyl ether, (3,4-epoxycyclohexyl)methyl(meth)acrylate, (meth)acrylic acid chloride, or (meth)acryl chloride, with a resin having a carboxyl group or a hydroxyl group. Particularly preferred binder resins are those resulting from a reaction with an alicyclic epoxy compound such as (3,4-epoxy cyclohexyl)methyl(meth)acrylate.

When an ethylenic double bond is preliminarily introduced into a resin having a carboxylic group or hydroxyl group as described above, it is preferable to bond a compound having an ethylenic double bond to from 2 to 50 mol %, preferably from 5 to 40 mol %, of the carboxyl group or hydroxyl group in the resin.

These acrylic resins preferably have a weight-average molecular weight, as measured by GPC, in a range of from 1,000 to 100,000. If the weight-average molecular weight is less than 1,000, it tends to be difficult to obtain a uniform coating film. On the other hand, if it exceeds 100,000, the development property tends to decrease. A preferred content of the carboxylic group is in a range of from 5 to 200 as an acid value. If the acid value is less than 5, the resin tends to be insoluble in an alkali developer. On the other hand, if it exceeds 200, the sensitivity may become lower.

These binder resins are contained in a range of usually from 10 to 80 wt %, preferably from 20 to 70 wt %, to the total solid content of the composition for a color filter.

(b) Monomer

There are no particular restrictions on the monomer as long as it is a polymerizable low molecular weight compound. A preferred monomer is an addition-polymerizable compound having at least one ethylenic double bond (hereinafter, abbreviated as an "ethylenic compound"). The ethylenic compound is a compound having an ethylenic double bond which is addition-polymerized by the action of a photopolymerization initiator system as described hereinafter, to cure when the composition for a color filter is exposed to active rays. Here the monomer in the present invention implies a concept obverse to a so-called polymer substance and implies a concept embracing not only monomers in a narrow sense but also dimers, trimers, and oligomers.

The ethylenic compound may be, for example, an unsaturated carboxylic acid, an ester of an unsaturated carboxylic acid with a monohydroxy compound, an ester of an aliphatic polyhydroxy compound with an unsaturated carboxylic acid, an ester of an aromatic polyhydroxy compound with an unsaturated carboxylic acid, an ester obtained by an esterification reaction of an unsaturated carboxylic acid and a polybasic carboxylic acid with a polyhydric hydroxy compound such as the aforementioned aliphatic polyhydroxy compound or aromatic polyhydroxy compound, an ethylenic compound with a urethane skeleton obtained by reacting a polyisocyanate compound with a (meth)acryloyl-containing hydroxy compound, or the like.

The unsaturated carboxylic acid may be, for example, (meth)acrylic acid, (anhydrous)maleic acid, crotonic acid, itaconic acid, fumaric acid, 2-(meth)acryloyloxyethyl succinic acid, 2-acryloyloxyethyl adipic acid, 2-(meth)acryloyloxyethyl phthalic acid, 2-(meth)acryloyloxyethyl hexahydrophthalic acid, 2-(meth)acryloyloxyethyl maleic acid, 2-(meth)acryloyloxypropyl succinic acid, 2-(meth)acryloyloxypropyl adipic acid, 2-(meth)acryloyloxypropyl hydrophthalic acid, 2-(meth)acryloyloxypropyl phthalic acid, 2-(meth)acryloyloxypropyl maleic acid, 2-(meth)acryloyloxybutyl succinic acid, 2-(meth)acryloyloxybutyl adipic acid, 2-(meth)acryloyloxybutyl hydrophthalic acid, 2-(meth) acryloyloxybutyl phthalic acid, 2-(meth)acryloyloxybutyl maleic acid, a monomer obtained by adding to (meth)acrylic acid one of lactones such as ε-caprolactone, β-propiolactone, γ-butyrolactone, δ-valerolactone, and so on, a monomer obtained by adding to a hydroxyalkyl(meth)acrylate, an acid (anhydride) such as (anhydrous)succinic acid, (anhydrous) phthalic acid or (anhydrous)maleic acid, or the like. Among them, (meth)acrylic acid and 2-(meth)acryloyloxyethyl succinic acid are preferred, and (meth)acrylic acid is more preferred. These may be used in combination of two or more.

The ester of an aliphatic polyhydroxy compound with an unsaturated carboxylic acid may be an acrylate such as ethylene glycol diacrylate, triethylene glycol diacrylate, trimethylolpropane triacrylate, trimethylolethane triacrylate, pentaerythritol diacrylate, pentaerythritol triacrylate, pentaerythritol tetraacrylate, dipentaerythritol tetraacrylate, dipentaerythritol pentaacrylate, dipentaerythritol hexaacrylate, glycerol acrylate, or the like. Further, the ester may be a methacrylate, an itaconate, a crotonate or a maleate obtained by replacing the acrylic acid moiety of the aforementioned acrylates with a methacrylic acid moiety, an itaconic acid moiety, a crotonic acid moiety or a maleic acid moiety, respectively.

The ester of an aromatic polyhydroxy compound with an unsaturated carboxylic acid may be hydroquinone diacrylate, hydroquinone dimethacrylate, resorcin diacrylate, resorcin dimethacrylate, pyrogallol triacrylate, or the like.

The ester obtained by an esterification reaction of an unsaturated carboxylic acid and a polybasic carboxylic acid with a polyhydric hydroxy compound is not necessarily a single substance, but it may be a mixture. Typical examples of the ester include a condensation product of acrylic acid, phthalic acid and ethylene glycol, a condensation product of acrylic acid, maleic acid and diethylene glycol, a condensation product of methacrylic acid, terephthalic acid and pentaerythritol, a condensation product of acrylic acid, adipic acid, butanediol and glycerol, and so on.

The ethylenic compound with a urethane skeleton obtained by reacting a polyisocyanate compound and a (meth)acryloyl group-containing hydroxy compound may be a reaction product of an aliphatic diisocyanate such as hexamethylene diisocyanate, trimethylhexamethylene diisocyanate, or the like; an alicyclic diisocyanate such as cyclohexane diisocyanate, isophorone diisocyanate, or the like; an aromatic diisocyanate such as tolylene diisocyanate, diphenylmethane diisocyanate, or the like, with a (meth)acryloyl group-containing hydroxy compound such as 2-hydroxyethyl acrylate, 2-hydroxyethyl methacrylate, 3-hydroxy(1,1,1-triacryloyloxymethyl)propane, 3-hydroxy(1,1,1-trimethacryloyloxymethyl)propane, or the like.

Other examples of the ethylenic compound used in the present invention include acryl amides such as ethylenebisacrylamide; allyl esters such as diallyl phthalate; vinyl group-containing compounds such as divinyl phthalate.

The compounding rate of the ethylenic compounds is usually in a range of from 10 to 80 wt %, preferably in a range of from 20 to 70 wt %, relative to the total solid content of the composition for a color filter.

(c) Colorant

In order to utilize the light from the backlight as effectively as possible, it is necessary to select a colorant so that, in accordance with the red, green and blue emission wavelengths of the backlight, the transmittance at the emission wavelengths of the phosphor in each color pixel becomes as high as possible, while the transmittance becomes as low as possible at the other emission wavelengths.

The present invention is characterized particularly by a high color gamut which has not been obtained by a conventional LED backlight, and accordingly, selection of a colorant particularly requires attention. Namely, the following conditions have to be met so as to sufficiently make use of the characteristics of a backlight having deep red and green emission wavelengths characteristic of the present invention.

First, a red pixel will be explained below.

The amount of light from a red pixel in a transparent or semi-transparent transmission mode is determined by the product of the emission from the backlight and the spectral transmittance at the red pixel of the color filter. Accordingly, a colorant is selected so that, in order to obtain a sufficient amount of light in a deep red wavelength region, i.e. from 620 to 680 nm, $I(620\text{-}680) \times T^R(620\text{-}680)$ is at least 1.1, preferably at least 1.2, more preferably at least 1.3, which is the product of the average value $I(620\text{-}680)$ of the relative emission intensity $I(\lambda_n)$ normalized by a total emission intensity from the LED backlight at a wavelength of from 620 to 680 nm, and the average value $T^R(620\text{-}680)$ of the spectral transmittance $T^R(\lambda_n)$ of the red color filter as represented by percentage at the same wavelength region. Further, in order to achieve a high color gamut without decreasing the brightness, the average transmittance $T^R(560\text{-}580)$ over the wavelength region of 560 nm$\leq \lambda_n \leq$580 nm is usually at least 15%, preferably at least 20%, more preferably at least 25%, particularly preferably at least 28%.

As the pigments which satisfy such conditions, organic pigments, such as azo type, phthalocyanine type, quinacridone type, benzimidazolone type, isoindoline type, dioxazine type, indanthrone type, perylene type and diketopyrrolopyrol type pigments, and, in addition thereto, various inorganic pigments, can be used.

Specifically, pigments having pigment numbers as listed below can be used, for example. Here, the term "C. I." below means a color index (C. I.).

Red colorant: C. I. pigment red 1, 2, 3, 4, 5, 6, 7, 8, 9, 12, 14, 15, 16, 17, 21, 22, 23, 31, 32, 37, 38, 41, 47, 48, 48:1, 48:2, 48:3, 48:4, 49, 49:1, 49:2, 50:1, 52:1, 52:2, 53, 53:1, 53:2, 53:3, 57, 57:1, 57:2, 58:4, 60, 63, 63:1, 63:2, 64, 64:1, 68, 69, 81, 81:1, 81:2, 81:3, 81:4, 83, 88, 90:1, 101, 101:1, 104, 108, 108:1, 109, 112, 113, 114, 122, 123, 144, 146, 147, 149, 151, 166, 168, 169, 170, 172, 173, 174, 175, 176, 177, 178, 179, 181, 184, 185, 187, 188, 190, 193, 194, 200, 202, 206, 207, 208, 209, 210, 214, 216, 220, 221, 224, 230, 231, 232, 233, 235, 236, 237, 238, 239, 242, 243, 245, 247, 249, 250, 251, 253, 254, 255, 256, 257, 258, 259, 260, 262, 263, 264, 265, 266, 267, 268, 269, 270, 271, 272, 273, 274, 275, 276.

Further, the following yellow colorant may be mixed with the above red colorant to finely adjust the color. Yellow colorant: C. I. pigment yellow 1, 1:1, 2, 3, 4, 5, 6, 9, 10, 12, 13, 14, 16, 17, 24, 31, 32, 34, 35, 35:1, 36, 36:1, 37, 37:1, 40, 41, 42, 43, 48, 53, 55, 61, 62, 62:1, 63, 65, 73, 74, 75, 81, 83, 87, 93, 94, 95, 97, 100, 101, 104, 105, 108, 109, 110, 111, 116, 119, 120, 126, 127, 127:1, 128, 129, 133, 134, 136, 138, 139, 142, 147, 148, 150, 151, 153, 154, 155, 157, 158, 159, 160, 161, 162, 163, 164, 165, 166, 167, 168, 169, 170, 172, 173, 174, 175, 176, 180, 181, 182, 183, 184, 185, 188, 189, 190, 191, 191:1, 192, 193, 194, 195, 196, 197, 198, 199, 200, 202, 203, 204, 205, 206, 207, 208.

Now, a green pixel will be explained below.

The following conditions are required to be met based on the same concept as for the red pixel.

In order to obtain an adequate amount of light in the deep green wavelength region, i.e. in a wavelength region of 500 nm$\leq \lambda_n \leq$530 nm, $I(500\text{-}530) \times T^G(500\text{-}530)$ is at least 1.2, preferably at least 1.3, more preferably at least 1.4, particularly preferably at least 1.8, where the average transmittance (%) and the average relative emission intensity over the above wavelength region are $T^G(500\text{-}530)$ and $I(500\text{-}530)$, respectively.

Further, in order to achieve a high color gamut without decreasing the brightness, the average transmittance $T^G(580\text{-}600)$ over the wavelength region of 580 nm$\leq \lambda_n \leq$600 nm is usually at least 20%, preferably at least 30%, more preferably at least 50%.

As the pigments which satisfy such conditions, organic pigments, such as azo type, phthalocyanine type, quinacridone type, benzimidazolone type, isoindoline type, dioxazine type, indanthrone type, perylene type and diketopyrrolopyrol type pigments, and, in addition thereto, various inorganic pigments, can be used.

Specifically, pigments having pigment numbers as listed below can be used, for example.

Green colorant: C. I. pigment green 1, 2, 4, 7, 8, 10, 13, 14, 15, 17, 18, 19, 26, 36, 45, 48, 50, 51, 54, 55.

Further, the above-described yellow colorant may be mixed with the above green colorant so as to finely adjust the color.

As a specific example of the green pixel which satisfies the above conditions, particularly preferred is one containing, as a green pigment, pigment green 36 and/or pigment green 7, and at least one of pigment yellow 150, pigment yellow 138 and pigment yellow 139 as a yellow pigment for color adjustment. Further, in a case where, as the phosphor, a combination of the red phosphor as represented by the above formula (3) (the phosphor (3-2-1-1)) and the green phosphor represented by the above formula (7) (the phosphor (3-2-2-1)) is selected, preferred is one wherein the total content of the green pigments and the total content of the yellow pigments satisfy the following relation (9). Further, more preferably the following relation (10) is satisfied, and particularly preferably the following relation (11) is satisfied.

$$0.9 \leq \text{(total weight of yellow pigment)/(total weight of green pigment)} \leq 2 \quad (9)$$

$$1 \leq \text{(total weight of yellow pigment)/(total weight of green pigment)} \leq 1.8 \quad (10)$$

$$1.05 \leq \text{(total weight of yellow pigment)/(total weight of green pigment)} \leq 1.5 \quad (11)$$

Now, a blue pixel will be explained below.

There are no particular restrictions on the blue pixel, and the following pigments can be used.

Specifically, pigments having pigment numbers as listed below can be used, for example.

Blue colorant: C. I. pigment blue 1, 1:2, 9, 14, 15, 15:1, 15:2, 15:3, 15:4, 15:6, 16, 17, 19, 25, 27, 28, 29, 33, 35, 36, 56, 56:1, 60, 61, 61:1, 62, 63, 66, 67, 68, 71, 72, 73, 74, 75, 76, 78, 79.

Violet colorant: C. I. pigment violet 1, 1:1, 2, 2:2, 3, 3:1, 3:3, 5, 5:1, 14, 15, 16, 19, 23, 25, 27, 29, 31, 32, 37, 39, 42, 44, 47, 49, 50.

Further, in addition to red, green and blue colors, the following pigments may further be used, as the case requires, so as to finely adjust the color.

Orange colorant: C. I. pigment orange 1, 2, 5, 13, 16, 17, 19, 20, 21, 22, 23, 24, 34, 36, 38, 39, 43, 46, 48, 49, 61, 62, 64, 65, 67, 68, 69, 70, 71, 72, 73, 74, 75, 77, 78, 79.

Brown colorant: C. I. pigment brown 1, 6, 11, 22, 23, 24, 25, 27, 29, 30, 31, 33, 34, 35, 37, 39, 40, 41, 42, 43, 44, 45.

Other colorants can be, of course, used.

The dyes may be azo type dyes, anthraquinone type dyes, phthalocyanine type dyes, quinoneimine type dyes, quinoline type dyes, nitro type dyes, carbonyl type dyes, methine type dyes, and so on.

The azo type dyes may be, for example, C. I. Acid Yellow 11, C. I. Acid Orange 7, C. I. Acid Red 37, C. I. Acid Red 180, C. I. Acid Blue 29, C. I. Direct Red 28, C. I. Direct Red 83, C. I. Direct Yellow 12, C. I. Direct Orange 26, C. I. Direct Green 28, C. I. Direct Green 59, C. I. Reactive Yellow 2, C. I. Reactive Red 17, C. I. Reactive Red 120, C. I. Reactive Black 5, C. I. Disperse Orange 5, C. I. Disperse Red 58, C. I. Disperse Blue 165, C. I. Basic Blue 41, C. I. Basic Red 18, C. I. Mordant Red 7, C. I. Mordant Yellow 5, C. I. Mordant Black 7, and so on.

The anthraquinone type dyes may be, for example, C. I. Vat Blue 4, C. I. Acid Blue 40, C. I. Acid Green 25, C. I. Reactive Blue 19, C. I. Reactive Blue 49, C. I. Disperse Red 60, C. I. Disperse Blue 56, C. I. Disperse Blue 60, and so on.

In addition, the phthalocyanine type dyes may be, for example, C. I. Pad Blue 5 and the like; the quinoneimine type dyes may be, for example, C. I. Basic Blue 3, C. I. Basic Blue 9, and so on; the quinoline type dyes may be, for example, C. I. Solvent Yellow 33, C. I. Acid Yellow 3, C. I. Disperse Yellow 64, and so on; and the nitro type dyes may be, for example, C. I. Acid Yellow 1, C. I. Acid Orange 3, C. I. Disperse Yellow 42, and so on.

Other colorants usable in the composition for a color filter may be inorganic colorants such as barium sulfate, lead sulfate, titanium oxide, yellow lead oxide, red iron oxide, chromium oxide and carbon black.

These colorants are preferably used as dispersed in an average particle size of at most 0.5 µm, preferably at most 0.2 µm, and more preferably at most 0.1 µm.

The content of these colorants is usually in a range of from 5 to 60 wt %, preferably from 10 to 50 wt % to the total solid content of the composition for a color filter.

(d) Other Components

The composition for a color filter can be doped with a photopolymerization initiation system, a thermal polymerization inhibitor, a plasticizer, a storage stabilizer, an over coating agent, a smoothing agent, a coating property-assisting agent, and any other additive, if the case demands.

(d-1) Photopolymerization Initiation System

In a case where the composition for a color filter comprises an ethylenic compound as a monomer (b), it is necessary to use a photopolymerization initiation system having a function of directly absorbing light or being sensitized with light to induce a decomposition or hydrogen abstraction reaction to generate polymerization-active radicals.

The photopolymerization initiation system comprises a system containing a polymerization initiator and an additive such as an accelerator in combination. The polymerization initiator may be, for example, a radical activator, such as metallocene compounds including titanocene compounds as described in each of JP-A-59-152396 and JP-A-61-151197, hexaaryl biimidazole derivatives such as 2-(2'-chlorophenyl)-4,5-diphenyl imidazol, halomethyl-s-triazine derivatives, N-aryl-α-amino acids such as N-phenyl glycine, salts of N-aryl-α-amino acids, esters of N-aryl-α-amino acids, and so on as described in JP-A-10-39503. The accelerator to be used may be, for example, alkyl N,N-dialkylamino benzoate such as ethyl N,N-dimethylaminobenzoate, a mercapto compound having a heterocyclic ring such as 2-mercaptobenzothiazole, 2-mercaptobenzoxazole or 2-mercaptobenzoimidazole, an aliphatic polyfunctional mercapto compound, or the like. Each of the polymerization initiator and the additive may be used in combination of two or more kinds.

The compounding rate of the photopolymerization initiation system is in a range of from 0.1 to 30 wt %, preferably from 0.5 to 20 wt %, more preferably from 0.7 to 10 wt % to the total solid content of the composition of the present invention. If the compounding rate is too low, the sensitivity will become lower. On the other hand, if it is too high, the solubility of unexposed portions in a developer will decrease, so as to easily induce development failure.

(d-2) Thermal Polymerization Inhibitor

The thermal polymerization inhibitor to be used may be, for example, hydroquinone, p-methoxyphenol, pyrogallol, catechol, 2,6-t-butyl-p-cresol, β-naphthol, or the like. The compounding rate of the thermal polymerization inhibitor is preferably in a range of from 0 to 3 wt % to the total solid content of the composition.

(d-3) Plasticizer

The plasticizer to be used may be, for example, dioctyl phthalate, didodecyl phthalate, triethylene glycol dicaprylate, dimethyl glycol phthalate, tricresyl phosphate, dioctyl adipate, dibutyl sebacate, glycerol triacetate, or the like. The compounding rate of the plasticizer is preferably in a range of at most 10 wt % to the total solid content of the composition.

(d-4) Sensitizing Dye

Furthermore, for a purpose of improving the sensitivity, a sensitizing dye according to a wavelength of an image exposure light source can be mixed in the composition for a color filter, if the case demands.

Examples of the sensitizing dye include xanthene dyes as described in JP-A-04-221958 and JP-A-04-219756, coumarin dyes having a heterocyclic ring as described in JP-A-03-239703 and JP-A-05-289335, 3-ketocoumarin compounds as described in JP-A-03-239703 and JP-A-05-289335, pyrromethene dyes as described in JP-A-06-19240, and dyes having a dialkyl aminobenzene skeleton as described in JP-A-47-2528, JP-A-54-155292, JP-B-45-37377, JP-A-48-84183, JP-A-52-112681, JP-A-58-15503, JP-A-60-88005, JP-A-59-56403, JP-A-02-69, JP-A-57-168088, JP-A-05-107761, JP-A-05-210240, and JP-A-04-288818.

Among these sensitizing dyes, preferred is an amino group-containing sensitizing dye, and more preferred is a compound having an amino group and a phenyl group in the same molecule. Particularly preferred is, for example, a benzophenone type compound such as 4,4'-bis(dimethylamino) benzophenone, 4,4'-bis(diethylamino)benzophenone, 2-aminobenzophenone, 4-aminobenzophenone, 4,4'-diaminobenzophenone, 3,3'-diaminobenzophenone or 3,4-diaminobenzophenone; a p-dialkylaminophenyl group-containing compound such as 2-(p-dimethylaminophenyl) benzoxazole, 2-(p-diethylaminophenyl)benzoxazole, 2-(p-dimethylaminophenyl)benzo[4,5]benzoxazole, 2-(p-dimethylaminophenyl)benzo[6,7]benzoxazole, 2,5-bis(p-diethylaminophenyl)1,3,4-oxazole, 2-(p-dimethylaminophenyl)benzothiazole, 2-(p-diethylaminophenyl)benzothiazole, 2-(p-dimethylaminophenyl)benzimidazole, 2-(p-diethylaminophenyl)benzimidazole, 2,5-bis(p-diethylaminophenyl)1,3,4-thiadiazole, (p-dimethylaminophenyl)pyridine, (p-diethylaminophenyl) pyridine, (p-dimethylaminophenyl)quinoline, (p-diethylaminophenyl)quinoline, (p-dimethylaminophenyl)pyrimidine or (p-diethylaminophenyl)pyrimidine; or the like. Among them, most preferred is 4,4'-dialkylaminobezophenone.

The compounding rate of the sensitizing dye is usually in a range of from 0 to 20 wt %, preferably from 0.2 to 15 wt %, and more preferably from 0.5 to 10 wt % to the total solid content of the composition for a color filter.

(d-5) Other Additives

The composition for a color filter can be optionally further doped with an adhesion-improving agent, a coating property-improving agent, a development-improving agent, and so on.

The composition for a color filter may be used as dissolved in a solvent, in order to control the viscosity and to dissolve the additives of the photopolymerization initiation system and others.

The solvent can be optionally selected in accordance with the components of the composition such as the binder resin (a), the monomer (b), etc. and the solvent may be, for example, diisopropyl ether, mineral spirit, n-pentane, amyl ether, ethyl caprylate, n-hexane, diethyl ether, isoprene, ethyl isobutyl ether, butyl stearate, n-octane, Varsol #2, Apco #18 solvent, diisobutylene, amyl acetate, butyl acetate, Apco thinner, butyl ether, diisobutyl ketone, methyl cyclohexene, methyl nonyl ketone, propyl ether, dodecane, Socal solvent No. 1 and No. 2, amyl formate, dihexyl ether, diisopropyl ketone, Solveso #150, (n, sec, t)-butyl acetate, hexene, Shell TS28 solvent, butyl chloride, ethyl amyl ketone, ethyl benzoate, amyl chloride, ethylene glycol diethyl ether, ethyl orthoformate, methoxymethylpentanone, methyl butyl ketone, methyl hexyl ketone, methyl isobutyrate, benzonitrile, ethyl propionate, methyl cellosolve acetate, methyl isoamyl ketone, methyl isobutyl ketone, propyl acetate, amyl acetate, amyl formate, bicyclohexyl, diethylene glycol monoethyl ether acetate, dipentene, methoxymethylpentanol, methyl amyl ketone, methyl isopropyl ketone, propyl propionate, propylene glycol-t-butyl ether, methyl ethyl ketone, methyl cellosolve, ethyl cellosolve, ethyl cellosolve acetate, carbitol, cyclohexanone, ethyl acetate, propylene glycol, propylene glycol monomethyl ether, propylene glycol monomethyl ether acetate, propylene glycol monoethyl ether, propylene glycol monoethyl ether acetate, dipropylene glycol monoethyl ether, dipropylene glycol monomethyl ether, dipropylene glycol monomethyl ether acetate, 3-methoxypropionic acid, 3-ethoxypropionic acid, methyl 3-ethoxypropionate, ethyl 3-ethoxypropionate, methyl 3-methoxypropionate, ethyl 3-methoxypropionate, propyl 3-methoxypropionate, butyl 3-methoxypropionate, diglyme, ethylene glycol acetate, ethylcarbitol, butylcarbitol, ethylene glycol monobutyl ether, propylene glycol-t-butyl ether, 3-methyl-3-methoxybutanol, tripropylene glycol methyl ether, 3-methyl-3-methoxybutyl acetate, or the like. These solvents may be used in combination of two or more.

The solid content in the color composition for a color filter is selected in accordance with a coating method to be applied. In a spin coat, a slit and spin coat, and a die coat widely used in the production of the color filter at present, an appropriate solid content is usually in a range of from 1 to 40 wt % and preferably in a range of from 5 to 30 wt %.

A combination of solvents is determined taking a dispersion stability of a pigment, a solubility to soluble components in the solid contents, such as the resin, monomer and photopolymerization initiator, a drying property in coating, and a drying property in a vacuum chamber dry process into consideration.

A composition for a color filter using the above compounded components is produced, for example, as follows.

First, a colorant is subjected to a dispersion treatment and controlled into a state of ink. The dispersion treatment is conducted by means of a paint conditioner, a sand grinder, a ball mill, a roll mill, a stone mill, a jet mill, a homogenizer or the like. The colorant is brought into a state of fine particles by the dispersion treatment, thereby achieving an improvement in transmittance of transmitted light and an improvement in a coating property.

The dispersion treatment is preferably conducted in such a system that a grinding resin having a dispersing function, dispersing additives such as a surfactant, a dispersing synergist, etc. are optionally used together with the colorant and the solvent. It is particularly preferable to use polymer-type dispersing additives, by virtue of its excellent dispersion stability over time.

For example, when the dispersion treatment is conducted by use of the sand grinder, it is preferred to use glass beads or zirconia beads having a particle size of from 0.05 to several millimeters. A temperature in the dispersion treatment is usually set in a range of from 0° C. to 100° C., preferably from room temperature to 80° C. A dispersing time is appropriately adjusted because an appropriate time for the dispersion treatment varies depending on the composition of ink (the colorant, the solvent and the dispersing additives), instrument specifications of the sand grinder, and so on.

Then the binder resin, monomer, photopolymerization initiation system, and others are mixed into the color ink obtained by the above dispersion treatment, to form a uniform solution. Since fine foreign particles are often mixed into the solution in each of the dispersion treatment step and the mixing step, the resulting solution is preferably filtered by means of a filter or the like.

EXAMPLES

The present invention will be more specifically described below with reference to Preparation Examples, Examples and Comparative Examples, but it is noted that the present invention is by no means intended to be limited to Examples below, without departing from the scope of the invention. In the following Examples, the term "parts" refers to "parts by weight".

(1) Preparation of Backlight (1-1) Preparation Example 1

Process of Preparation of Backlight 1

A light emitting device was prepared in accordance with the following procedure.

A light emitting diode which emits a light of 460 nm was connected to the bottom of a cup of a frame by die bonding, and then the light emitting diode and an electrode of the frame were connected by wire bonding.

$Ca_{2.97}Ce_{0.03}Sc_2Si_3O_{12}$ as a phosphor which emits light in a green band and $Ca_{0.996}Eu_{0.004}S$ as a phosphor which emits a light in a red band were used. They were kneaded with an epoxy resin to obtain a paste, which was coated on the light emitting diode in the cup and cured.

Then, a cyclic polyolefin type resin sheet (trade name "ZEONOR" manufactured by Zeon Corporation) of wedge shape, which had a size of 289.6×216.8 mm and thicknesses varying along the direction of a short side between a maximum thickness of 2.0 mm and a minimum thickness of 0.6 mm, was used as a light guide, a light source comprising the above-mentioned light emitting diode was placed along the thick long side, so as to allow emitted light from the linear light source to efficiently enter the thick side (light entrance surface) of the light guide.

The surface opposite to the light exit surface of the light guide was patterned by transferring fine circular patterns of rough surfaces with gradually increasing diameter according to the distance from the linear light source, from a die to the surface. The diameter of the rough surface patterns was 130 μm near the light source, gradually increased with distance from the light source, and was 230 μm at the most distant position.

The die used in the formation of the fine circular patterns of the rough surfaces herein was prepared by laminating a dry film resist in a thickness of 50 μm on a SUS substrate, forming openings in portions corresponding to the patterns by photolithography, further subjecting the die to uniform blasting under a projection pressure of 0.3 MPa with spherical glass beads of #600 by a sandblasting method, and thereafter peeling the dry film resist off.

The light exit surface of the light guide was provided with a triangular prism array with the apex angle of 90° and the pitch of 50 μm so that the ridge lines were approximately perpendicular to the light entrance surface of the light guide, thus achieving a structure of enhancing a light collecting property of beams emitted from the light guide. A die used in the formation of the light collecting element array consisting of the triangular prism array was prepared by a process of cutting a stainless steel substrate overlaid with an M nickel coating by electroless plating, with a single-crystal diamond cutting tool.

Figure 4:
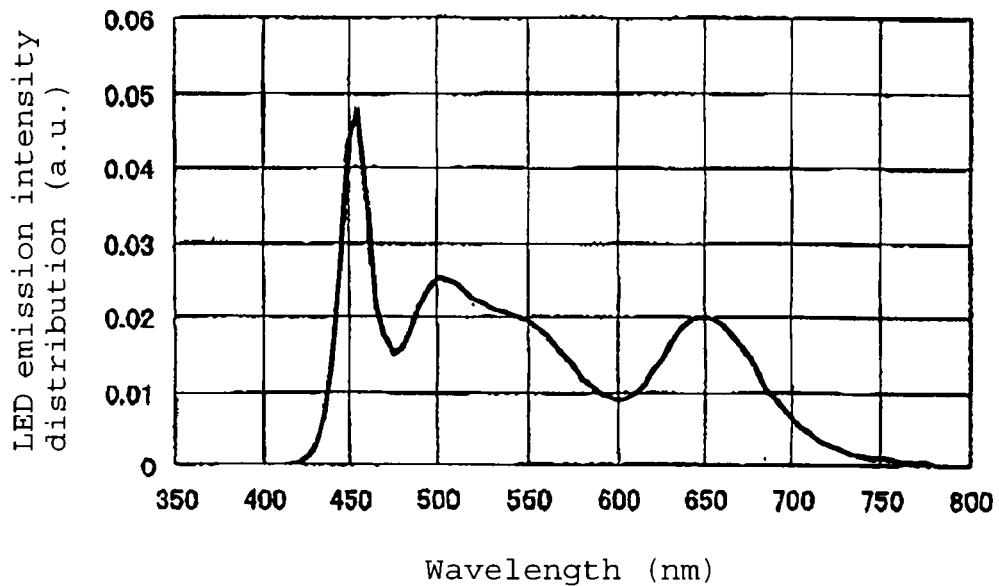
FIG. 4 is a relative emission spectrum of a backlight 1 obtained in Preparation Example 1.

A light reflecting sheet ("Lumirror E60L" manufactured by TORAY Industries, Inc.) was placed on the side opposite to the light exit surface of the light guide, a light diffuser sheet was placed on the light exit surface, and two sheets with a triangular prism array having the apex angle of 90° and the pitch of 50 μm ("BEFIII" manufactured by SUMITOMO 3M Limited) were placed on the light diffuser sheet so that the ridge lines of the respective two prism sheets became perpendicular to each other, thereby obtaining a backlight 1. A relative emission spectrum of the backlight 1 thus obtained is presented in FIG. 4.

(1-2) Preparation Example 2

Process of Preparation of Backlight 2

Figure 5:
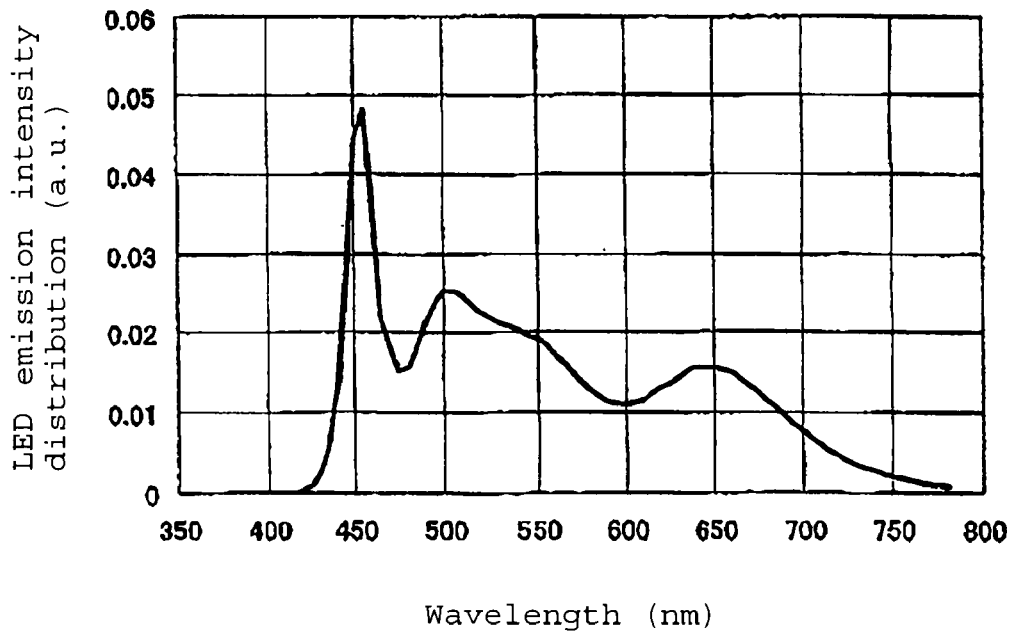
FIG. 5 is a relative emission spectrum of a backlight 2 obtained in Preparation Example 2.

A backlight 2 was prepared in the same manner as in Preparation Example 1 except that $Ca_{0.992}AlSiEu_{0.008}N_{2.85}O_{0.15}$ was used as a phosphor which emits a light in a red band. A relative emission spectrum of the backlight 2 thus obtained is presented in FIG. 5.

(1-3) Preparation Example 3

Process of Preparation of Backlight 3

Figure 6:
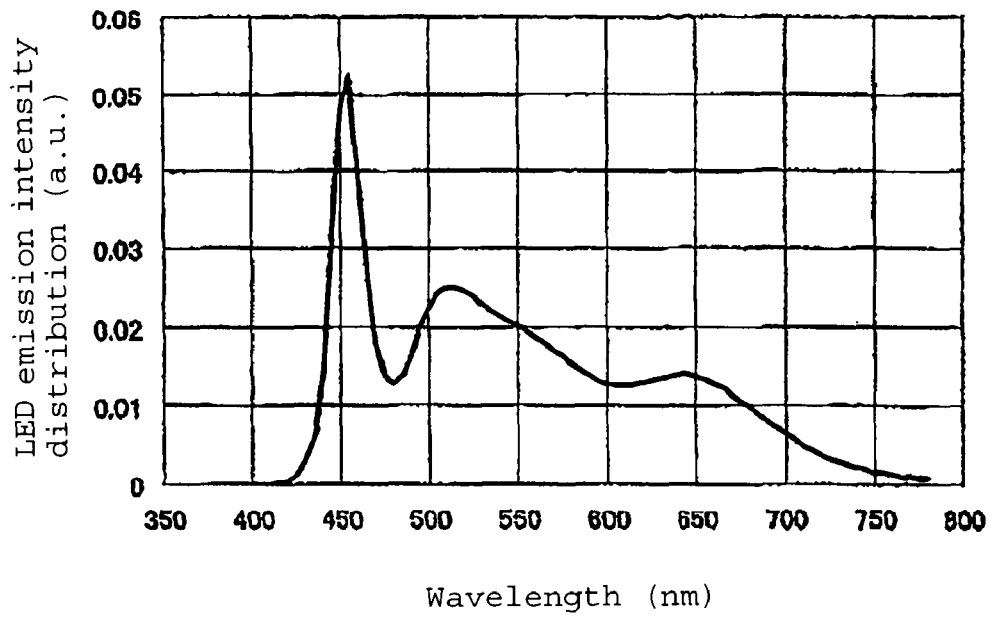
FIG. 6 is a relative emission spectrum of a backlight 3 obtained in Preparation Example 3.

A backlight 3 was prepared in the same manner as in Preparation Example 1 except that $Ca_{0.99}Ce_{0.01}Sc_2O_4$ was used as a phosphor which emits a light in a green band and $Ca_{0.992}AlSiEu_{0.008}N_{2.85}O_{0.15}$ was used as a phosphor which emits a light in a red band. A relative emission spectrum of the backlight 3 thus obtained is presented in FIG. 6.

(1-4) Preparation Example 4

Process of Preparation of Backlight 4

Figure 7:
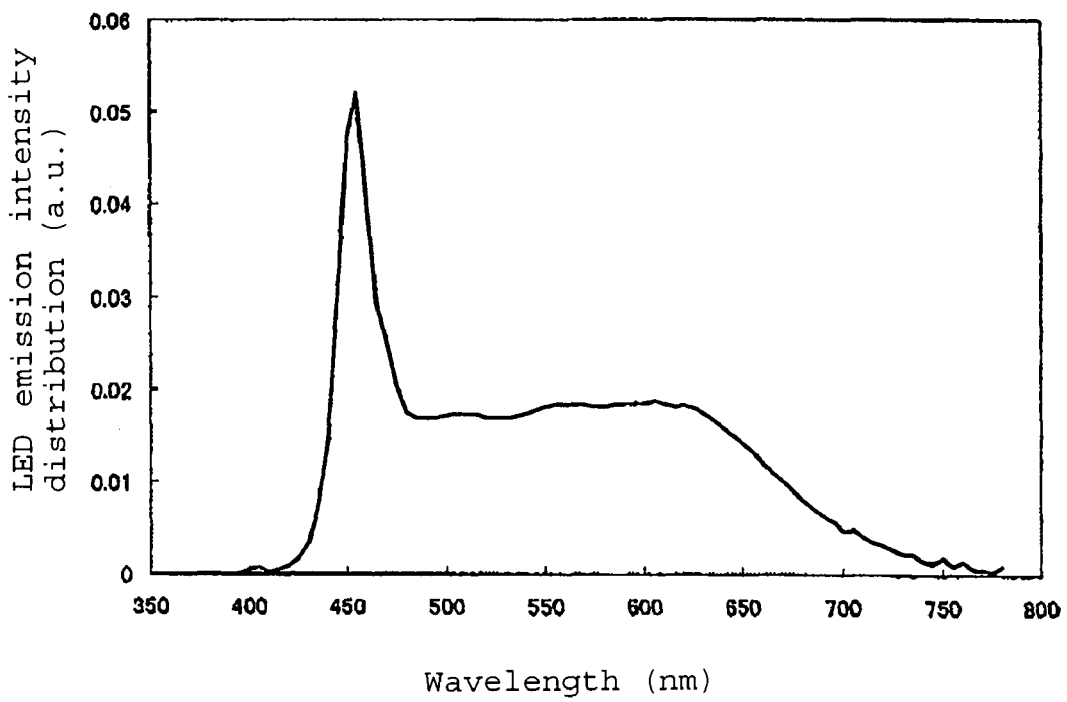
FIG. 7 is a relative emission spectrum of a backlight 4 obtained in Preparation Example 4.

A backlight 4 was prepared in the same manner as in Preparation Example 1 except that $Sr_{0.792}Ca_{0.2}Eu_{0.008}AlSiN_3$ was used as a phosphor which emits a light in a red band. A relative emission spectrum of the backlight 4 thus obtained is presented in FIG. 7.

(1-5) Preparation Example 5

Process of Preparation of Backlight 5

Figure 8:
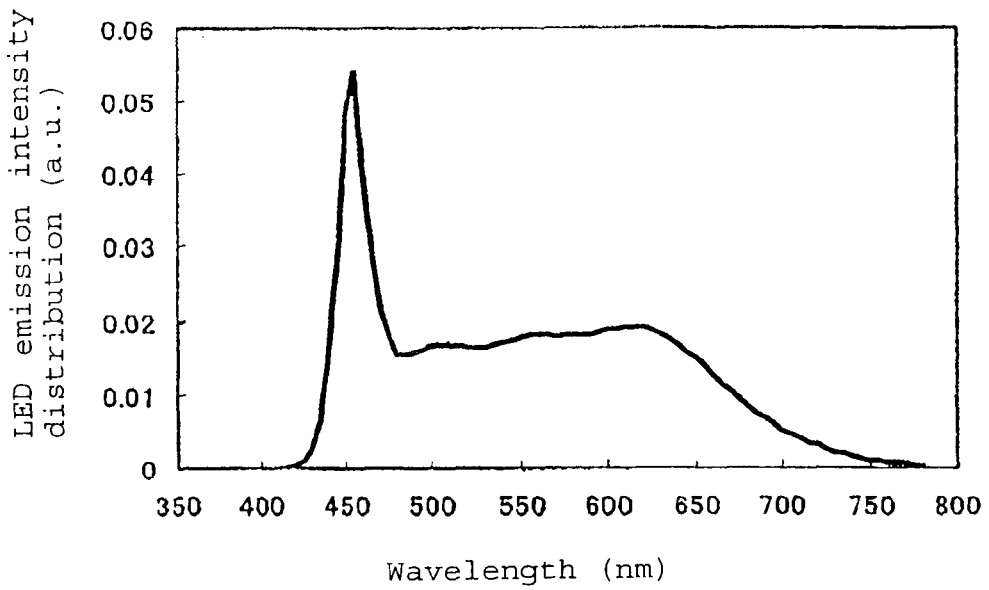
FIG. 8 is a relative emission spectrum of a backlight 5 obtained in Preparation Example 5.

A backlight 5 was prepared in the same manner as in Preparation Example 1 except that $Ca_{2.94}Ce_{0.06}Sc_{1.94}Mg_{0.06}Si_3O_{12}$ was used as a phosphor which emits a light in a green band and $Sr_{0.792}Ca_{0.2}Eu_{0.008}AlSiN_3$ was used as a phosphor which emits a light in a red band. A relative emission spectrum of the backlight 5 thus obtained is presented in FIG. 8.

(1-6) Preparation Example 6

Process of Preparation of Backlight 6

A light emitting device was prepared in accordance with the following procedure.

A light emitting diode which emits a light of 460 nm was connected to the bottom of a cup of a frame by die bonding, and then the light emitting diode and an electrode of the frame were connected by wire bonding.

$Y_{2.8}Tb_{0.1}Ce_{0.1}Al_5O_{12}$ as a phosphor which emits a light in a yellow band was used. The phosphor was kneaded with an epoxy resin to obtain a paste, which was coated on the light emitting diode in the cup and cured.

Figure 9:
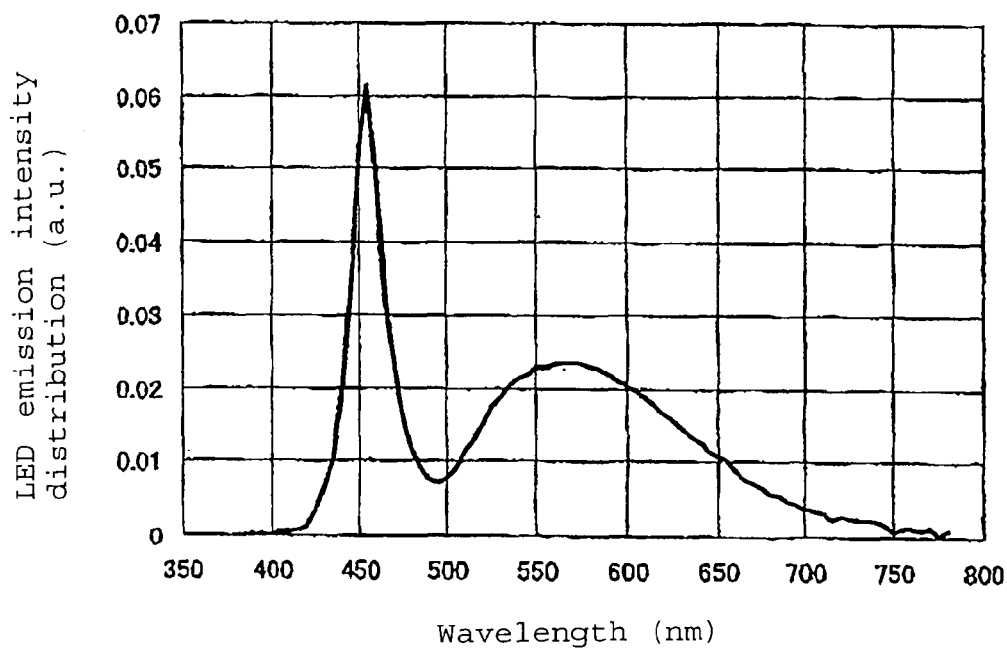
FIG. 9 is a relative emission spectrum of a backlight 6 obtained in Preparation Example 6.

Then, in the same manner as in Preparation Example 1, a backlight 6 was obtained. A relative emission spectrum of the backlight 6 thus obtained is presented in FIG. 9.

(2) Preparation Example 7

Preparation of Binder Resin

A flask was charged with 20 parts of a styrene-acrylic acid resin having an acid value of 200 and a weight-average molecular weight of 5,000, 0.2 part of p-methoxyphenol, 0.2 part of dodecyltrimethylammonium chloride, and 40 parts of propylene glycol monomethyl ether acetate, and then 7.6 parts of (3,4-epoxycyclohexyl)methyl acrylate was dropwise added thereinto, followed by reaction at a temperature of 100° C. for 30 hours. The reaction solution was put into water to reprecipitate, and a reprecipitated product was dried to obtain a resin. A neutralization titration was conducted with KOH, and the acid value of the resin was found to be 80 mg-KOH/g.

(3) Preparation Example 8

Preparation of Resist Solution

A resist solution was obtained by mixing components below at a rate below and stirring the components with a stirrer until the components were completely dissolved.

Binder resin prepared in Preparation Example 7: 2.0 parts
Dipentaerythritol hexaacrylate: 1.0 part
Photopolymerization initiation system
   2-(2'-chlorophenyl)-4,5-diphenylimidazole: 0.06 part
   2-mercaptobenzothiazole: 0.02 part
   4,4'-bis(diethylamino)benzophenone: 0.04 part
Solvent (propylene glycol monomethyl ether acetate): 9.36 parts
Surfactant ("FC-430" manufactured by SUMITOMO 3M Limited): 0.0003 part (4) Preparation of Color Filter (4-1) Preparation Example 9

Preparation of Red Pixels A to J 75 parts of propylene glycol monomethyl ether acetate, 16.7 parts of a red pigment P.R.254 and 8.3 parts of a urethane type dispersion resin were mixed and stirred with a stirrer for three hours to prepare a mill base in a solid content of 25 wt %. This mill base was subjected to a dispersion treatment at a peripheral velocity of 10 m/s and for a retention time of three hours with a bead mill system using 600 parts of 0.5 mmφ zirconia beads, thereby obtaining a P.R.254 dispersed ink.

Another mill base was prepared in the same composition as in the above P.R.254 case except for a change of the pigment to P.Y.139, and was subjected to a dispersion treatment under similar dispersion conditions for a retention time of two hours, thereby obtaining a P.Y.139 dispersed ink.

Further, another mill base was prepared in the same composition as in the above P.R.254 case except for a change of the pigment to P.R.177, and was subjected to a dispersion treatment under similar dispersion conditions for a retention time of three hours, thereby obtaining a P.R.177 dispersed ink The dispersed inks obtained as described above and the resist solution prepared in the above Preparation Example 8 were mixed and stirred at a compounding ratio (wt %) as shown in the following Table 1, and a solvent (propylene glycol monomethyl ether acetate) was added thereto so as to achieve a final solid content of 25 wt %, thereby obtaining a composition for a red color filter.

The resultant composition for a color filter was applied and dried to a dry film thickness of 2.5 μm on a 10 cm×10 cm glass substrate ("AN635" manufactured by Asahi Glass Company, Limited) with a spin coater. The entire surface of this substrate was exposed to ultraviolet light of 100 mJ/cm², and development was carried out with an alkali developer. Then, the substrate was post-baked at 230° C. in an oven for 30 minutes, thereby preparing each of red pixel samples A to J for measurement.

TABLE 1

| Red pixel | R254 | R177 | Y139 | Clear |
|---|---|---|---|---|
| A | 21.6 | 0.0 | 4.2 | 74.2 |
| B | 27.8 | 0.0 | 5.7 | 66.5 |
| C | 27.0 | 0.0 | 1.9 | 71.1 |
| D | 40.2 | 0.0 | 0.0 | 59.8 |
| E | 30.3 | 2.4 | 0.0 | 67.3 |
| F | 38.1 | 5.3 | 0.0 | 56.6 |
| G | 26.9 | 5.0 | 0.0 | 68.2 |
| H | 26.9 | 4.2 | 0.0 | 69.0 |
| I | 24.0 | 12.2 | 0.0 | 63.8 |
| J | 29.6 | 19.4 | 0.0 | 51.0 |

(4-2) Preparation Example 10

Preparation of Green Pixels A to J

A mill base was prepared in the same composition as in the P.R.254 case in Preparation Example 9 except for a change of the pigment to P.G.36, and was subjected to a dispersion treatment under similar dispersion conditions for a retention time of one hour, thereby obtaining a P.G.36 dispersed ink.

Another mill base was prepared in the same composition as in Preparation Example 9 except for a change of the pigment to P.Y.150, and was subjected to a dispersion treatment under similar dispersion conditions for a retention time of two hours, thereby obtaining a P.Y.150 dispersed ink.

The dispersed inks obtained as described above and the resist solution prepared in the above Preparation Example 8 were mixed and stirred at a compounding ratio as shown in the following Table 2, and a solvent (propylene glycol monomethyl ether acetate) was added thereto so as to achieve a final solid content of 25 wt %, thereby obtaining a composition for a green color filter.

The resultant composition for a color filter was applied and dried to a dry film thickness of 2.5 μm on a 10 cm×10 cm glass substrate ("AN635" manufactured by Asahi Glass Company, Limited) with a spin coater. The entire surface of this substrate was exposed to ultraviolet light of 100 mJ/cm², and development was carried out with an alkali developer. Then, the substrate was post-baked at 230° C. in an oven for 30 minutes, thereby preparing each of green pixel samples A to J for measurement.

TABLE 2

| Green Pixel | G36 | Y150 | Y139 | Clear |
|---|---|---|---|---|
| A | 14.0 | 14.0 | 0.5 | 71.5 |
| B | 33.0 | 8.3 | 2.7 | 56.0 |
| C | 14.9 | 14.9 | 0.2 | 70.0 |
| D | 34.8 | 8.7 | 2.6 | 53.9 |
| E | 15.9 | 11.1 | 0.0 | 73.0 |
| F | 35.0 | 14.7 | 0.0 | 50.3 |
| G | 27.5 | 11.6 | 0.0 | 61.0 |
| H | 27.8 | 10.7 | 0.0 | 61.6 |
| I | 46.7 | 7.8 | 0.0 | 45.5 |
| J | 56.5 | 5.3 | 0.0 | 38.2 |

(4-3) Preparation Example 11

Preparation of Blue Pixels A to J

A mill base was prepared in the same composition as in the P.R.254 case in Preparation Example 9 except for a change of the pigment to P.G.15:6, and was subjected to a dispersion treatment under similar dispersion conditions for a retention time of one hour, thereby obtaining a P.G.15:6 dispersed ink.

Further, another mill base was prepared in the same composition as in the P.R.254 case in Preparation Example 9 except for a change of the pigment to P.V.23, and was subjected to a dispersion treatment under similar dispersion conditions for a retention time of two hours, thereby obtaining a P.V.23 dispersed ink.

The dispersed inks obtained as described above and the resist solution prepared in the above Preparation Example 8 were mixed and stirred at a compounding ratio as shown in the following Table 3, and a solvent (propylene glycol monomethyl ether acetate) was added thereto so as to achieve a final solid content of 25 wt %, thereby obtaining a composition for a blue color filter.

The resultant composition for a color filter was applied and dried to a dry film thickness of 2.5 μm on a 10 cm×10 cm glass substrate ("AN635" manufactured by Asahi Glass Company, Limited) with a spin coater. The entire surface of this substrate was exposed to ultraviolet light of 100 mJ/cm², and development was carried out with an alkali developer. Then, the substrate was post-baked at 230° C. in an oven for 30 minutes, thereby preparing each of blue pixel samples A to J for measurement.

TABLE 3

| Blue Pixel | B15:6 | V23 | Clear |
|---|---|---|---|
| A | 10.8 | 8.0 | 81.2 |
| B | 20.1 | 4.4 | 75.5 |
| C | 10.5 | 8.0 | 81.5 |
| D | 19.7 | 4.4 | 75.9 |
| E | 11.3 | 7.1 | 81.6 |
| F | 21.6 | 3.5 | 74.9 |
| G | 11.7 | 6.5 | 81.9 |
| H | 12.5 | 6.0 | 81.6 |
| I | 16.1 | 3.9 | 80.0 |
| J | 31.7 | 0.0 | 68.3 |

(4-4) Preparation of Color Filters A to J

The above red, green and blue pixels with the same alphabet were combined to prepare color filters A to J.

In accordance with the method shown below, the backlights using a LED shown in Preparation Examples 1 to 6 and the color filters A to J were combined to measure the color gamut and the brightness (color temperature). The results are shown in Table 4.

Examples 1 to 8 and Comparative Examples 1 to 2

For each of the red pixel samples, the green pixel samples and the blue pixel samples shown in the above Preparation Examples, a transmittance spectrum was measured with a spectrum analyzer ("U-3500" manufactured by Hitachi Ltd.). Further, an emission spectrum of the backlight was measured by a brightness measuring apparatus ("CS-1000" manufactured by Konica Minolta Holdings, Inc.).

The chromaticity (x,y,Y) was calculated from the obtained transmittance spectrum and emission spectrum of the backlight. The value Y corresponds to the efficiency of emission from the backlight utilized.

The results are shown in Table 4. The value Y of White in Table represents the efficiency of emission from the backlight utilized as the whole display.

As shown in Table 4, when a display with a high color gamut at an EBU standard (NTSC percentage of 72%) or at a NTSC percentage of 85% was designed, the value Y considerably decreases with a conventional backlight, whereas a high value Y can be achieved by using the technique of the present invention. Namely, it becomes possible to obtain a higher brightness with a low electric consumption.

Further, each of the color filters of Examples 1, 3, 5, 7 and 8 has an average value $T^B(460-480)$ of the spectral transmittance at a wavelength at every interval of 5 nm of from 460 to 480 nm of at most 63.5%. Accordingly, in a case where it is required to reduce a light having a wavelength of from 460 to 480 nm, such a requirement can be achieved by using the color filter of Example 1, 3, 5, 7 or 8.

Further, coating films of the compositions for color filters of the respective colors prepared in the above Preparation Examples 6 to 11 were exposed under 100 mJ/cm² with a test pattern mask and developed, whereupon it was confirmed that good patterns were obtained in all the samples.

TABLE 4

|  |  | Ex. 1 | Ex. 2 | EX. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|---|
| LED backlight |  | 1 | 1 | 2 | 2 | 3 | 3 | 4 | 5 | 6 | 6 |
| Color filter |  | A | B | C | D | E | F | G | H | I | J |
| Average relative | I(620-680) | 0.017 | 0.017 | 0.014 | 0.014 | 0.013 | 0.013 | 0.015 | 0.014 | 0.011 | 0.011 |
| emission intensity | I(500-530) | 0.024 | 0.024 | 0.023 | 0.023 | 0.024 | 0.024 | 0.017 | 0.017 | 0.013 | 0.013 |
| Red | x | 0.640 | 0.660 | 0.640 | 0.659 | 0.640 | 0.660 | 0.640 | 0.640 | 0.640 | 0.660 |
|  | y | 0.330 | 0.330 | 0.330 | 0.331 | 0.330 | 0.330 | 0.330 | 0.330 | 0.330 | 0.330 |
|  | Y | 18.65 | 17.20 | 18.01 | 16.67 | 16.65 | 14.82 | 21.82 | 22.98 | 17.80 | 15.40 |

TABLE 4-continued

|  |  | Ex. 1 | Ex. 2 | EX. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|---|
| Green | x | 0.290 | 0.250 | 0.290 | 0.250 | 0.290 | 0.250 | 0.290 | 0.290 | 0.290 | 0.250 |
|  | y | 0.600 | 0.650 | 0.600 | 0.650 | 0.600 | 0.650 | 0.600 | 0.600 | 0.600 | 0.650 |
|  | Y | 66.93 | 49.49 | 66.44 | 48.47 | 66.00 | 50.70 | 50.26 | 49.83 | 45.68 | 31.00 |
| Blue | x | 0.150 | 0.140 | 0.150 | 0.140 | 0.150 | 0.143 | 0.150 | 0.150 | 0.150 | 0.143 |
|  | y | 0.060 | 0.080 | 0.060 | 0.080 | 0.060 | 0.081 | 0.060 | 0.060 | 0.060 | 0.081 |
|  | Y | 5.50 | 8.50 | 5.50 | 8.52 | 5.77 | 8.80 | 6.36 | 6.47 | 7.17 | 10.57 |
| White | x | 0.317 | 0.291 | 0.314 | 0.288 | 0.306 | 0.279 | 0.322 | 0.326 | 0.299 | 0.273 |
|  | y | 0.351 | 0.321 | 0.350 | 0.318 | 0.345 | 0.321 | 0.307 | 0.304 | 0.283 | 0.253 |
|  | Y | 30.36 | 25.06 | 29.98 | 24.55 | 29.47 | 24.77 | 26.15 | 26.43 | 23.55 | 18.99 |
| Color temperature (K) |  | 6181 | 7926 | 6291 | 8179 | 6719 | 8762 | 6081 | 5895 | 8311 | 14543 |
| NTSC percentage (%) |  | 72 | 85 | 72 | 85 | 72 | 85 | 72 | 72 | 72 | 85 |
| Value (%) of the left side of the formula (1) |  | 1.6 | 1.6 | 1.3 | 1.3 | 1.2 | 1.2 | 1.3 | 1.4 | *1.0 | *1.0 |
| Value (%) of the left side of the formula (2) |  | 33.8 | 28.4 | 29.4 | 24.8 | 23.4 | 16.9 | 21.2 | 22.4 | *14.1 | *8.4 |
| Value (%) of the left side of the formula (5) |  | 1.9 | 1.5 | 1.9 | 1.5 | 2.0 | 1.7 | 1.3 | 1.3 | *1.0 | *0.9 |
| Value (%) of the left side of the formula (6) |  | 55.2 | 23.2 | 52.9 | 21.6 | 49.4 | 22.2 | 29.8 | 29.3 | *19.3 | *5.4 |
| $T^B$ (460-480) (%) |  | 56.7 | 67.8 | 56.8 | 68.1 | 59.8 | 70.5 | 62.1 | 63.5 | 71.6 | 81.6 |
| Dioxazine violet pigment (%) based on all the pigments |  | 42 | 18 | 43 | 18 | 39 | 14 | 35 | 32 | 24 | 0 |

"*" represents that the formula (1), (2), (5) or (6) of the present specification is not satisfied.

INDUSTRIAL APPLICABILITY

According to the present invention, reproduction of a deep red and green image can be realized without sacrifice of the brightness of the image even with a LED backlight. Further, by using a blue resist and a color filter corresponding to the above deep red and green, a high gamut of the entire image can be achieved. Further, it is possible to provide a color image display device of which the white balance can easily be adjusted, without sacrifice of the productivity in mounting by achieving red, green and blue emission with one chip. Thus, the present invention is highly industrially applicable in fields of a composition for a color filter, a color filter, a color image display device, etc.

The entire disclosures of Japanese Patent Application No. 2004-129417 filed on Apr. 26, 2004 and Japanese Patent Application No. 2004-199851 filed on Jul. 6, 2004 including specifications, claims, drawings and summaries are incorporated herein by reference in their entireties.

The invention claimed is:

1. A color image display device comprising a combination of light shutters, a color filter having color elements of at least three colors of red, green and blue corresponding to the light shutters, and a backlight for transmission illumination, wherein the backlight contains a LED, and under the following definitions: $\lambda_n$ nm represents a wavelength at every interval of 5 nm in the visible light range of from 380 to 780 nm; $T^R(\lambda_n)$ a spectral transmittance (%) at a wavelength $\lambda_n$ nm by a red pixel of the color filter; and $I(\lambda_n)$ a relative emission intensity, normalized by a total emission intensity, at a wavelength $\lambda_n$ nm from the backlight, the device satisfies the following condition (1):

$$I(620\text{-}680) \times T^R(620\text{-}680) \geq 1.1 \quad (1)$$

wherein $T^R(620\text{-}680)$ and $I(620\text{-}680)$ represent the average transmittance (%) and the average relative emission intensity at 620 nm $\leq \lambda_n \leq$ 680 nm, respectively, and $I(\lambda_n)$ is defined as follows:

$$S(\lambda_n) = \frac{\int_{\lambda_n - \Delta\lambda/2}^{\lambda_n + \Delta\lambda/2} s(\lambda) d\lambda}{\Delta\lambda}$$

$$I(\lambda_n) = \frac{s(\lambda_n)}{\sum_{\lambda=380}^{780} s(\lambda_n)}$$

where $S(\lambda)$ represents a measured value of emission intensity at a wavelength $\lambda$ from the backlight, and $\Delta\lambda$=5 nm.

2. The color image display device according to claim 1, wherein the color filter further satisfies the following condition (2):

$$T^R(560\text{-}580) \leq 15\% \quad (2)$$

wherein $T^R(560\text{-}580)$ represents the average transmittance (%) of the color filter at 560 nm $\leq \lambda_n \leq$ 580 nm.

3. The color image display device according to claim 1 or 2, wherein the backlight has a phosphor layer or a phosphor film, and the phosphor layer or the phosphor film contains a phosphor activated with europium.

4. The color image display device according to claim 3, comprising a wherein a light source for the backlight comprises a combination of a blue or deep blue LED and a phosphor, and has at least one main component for emission in each of the wavelength regions of from 430 to 470 nm, from 500 to 540 nm, and from 600 to 680 nm.

5. The color image display device according to claim 1 or 2, wherein a light source for the backlight comprises a combination of a blue or deep blue LED and a phosphor, and has at least one main component for emission in each of the wavelength regions of from 430 to 470 nm, from 500 to 540 nm, and from 600 to 680 nm.

* * * * *